(12) United States Patent
Singh et al.

(10) Patent No.: US 8,555,262 B2
(45) Date of Patent: *Oct. 8, 2013

(54) SCHEMA-BASED DYNAMIC PARSE/BUILD ENGINE FOR PARSING MULTI-FORMAT MESSAGES

(75) Inventors: Thakur L. Singh, Fremont, CA (US); Sara K. Garrison, Orinda, CA (US); Mark Carlson, Half Moon Bay, CA (US); Kamlakar Singh, Foster City, CA (US); Shajen Devassey, Foster City, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 497 days.

This patent is subject to a terminal disclaimer.

(21) Appl. No.: 12/707,634

(22) Filed: Feb. 17, 2010

(65) Prior Publication Data

US 2010/0211938 A1   Aug. 19, 2010

Related U.S. Application Data

(63) Continuation of application No. 11/172,397, filed on Jun. 29, 2005, now Pat. No. 7,694,287.

(51) Int. Cl.
*G06F 9/45* (2006.01)
*G06F 9/44* (2006.01)

(52) U.S. Cl.
USPC ............ 717/143; 717/104; 717/107; 717/136

(58) Field of Classification Search
None
See application file for complete search history.

(56) References Cited

U.S. PATENT DOCUMENTS

| | | | |
|---|---|---|---|
| 5,341,477 A | 8/1994 | Pitkin et al. |
| 5,459,837 A | 10/1995 | Caccavale |
| 5,521,910 A | 5/1996 | Matthews |
| 5,754,543 A | 5/1998 | Seid |
| 5,805,798 A | 9/1998 | Kearn et al. |
| 5,974,460 A | 10/1999 | Maddalozzo, Jr. et al. |

(Continued)

FOREIGN PATENT DOCUMENTS

| | | |
|---|---|---|
| JP | 09-311800 | 12/1997 |
| JP | 2003323443 A | 11/2003 |

(Continued)

OTHER PUBLICATIONS

Korhonen et al., Visualization of EDI messages: facing the problems in the use of XML, Sep. 2003, 8 pages.*

(Continued)

*Primary Examiner* — Thuy Dao
(74) *Attorney, Agent, or Firm* — Kilpatrick Townsend Stockton LLP

(57) ABSTRACT

A parse/build engine that can handle multi-format financial messages. The engine converts the different format messages into a common format, and the common format message is then processed by the business service application. A parser examines the message and determines an appropriate schema for the particular format of message received. The schema is a data structure in a schema registry that includes a grammar structure for the received format as well as pointers to handlers for converting the different fields of the message into the internal message format using the grammar structure (the "grammar" can include field sequence, field type, length, character encoding, optional and required fields, etc.). The handlers are individually compiled. As formats change, new formats or changes to old formats can be dynamically added to the parse/build engine by loading new schema and handlers.

24 Claims, 18 Drawing Sheets

(56) References Cited

U.S. PATENT DOCUMENTS

| | | | |
|---|---|---|---|
| 6,006,264 | A | 12/1999 | Colby et al. |
| 6,016,307 | A | 1/2000 | Kaplan et al. |
| 6,039,245 | A | 3/2000 | Symonds et al. |
| 6,091,724 | A | 7/2000 | Chandra et al. |
| 6,134,598 | A | 10/2000 | Raman |
| 6,144,641 | A | 11/2000 | Kaplan et al. |
| 6,302,326 | B1 | 10/2001 | Symonds et al. |
| 6,317,438 | B1 | 11/2001 | Trebes, Jr. |
| 6,389,479 | B1 | 5/2002 | Boucher et al. |
| 6,430,184 | B1 | 8/2002 | Robins et al. |
| 6,456,594 | B1 | 9/2002 | Kaplan et al. |
| 6,460,120 | B1 | 10/2002 | Bass et al. |
| 6,473,404 | B1 | 10/2002 | Kaplan et al. |
| 6,487,286 | B1 | 11/2002 | Reaves et al. |
| 6,535,488 | B1 | 3/2003 | Mahe |
| 6,732,175 | B1 | 5/2004 | Abjanic |
| 6,754,188 | B1 | 6/2004 | Garahi et al. |
| 6,788,688 | B2 | 9/2004 | Trebes, Jr. |
| 6,802,067 | B1 | 10/2004 | Camp et al. |
| 6,839,700 | B2 | 1/2005 | Doyle et al. |
| 6,886,166 | B2 | 4/2005 | Harrison et al. |
| 7,047,285 | B2 | 5/2006 | Burgess |
| 7,058,691 | B1 | 6/2006 | Yu et al. |
| 7,188,336 | B2 | 3/2007 | Humphries |
| 7,493,594 | B2 * | 2/2009 | Shenfield et al. ............. 717/107 |
| 7,673,282 | B2 * | 3/2010 | Amaru et al. ................. 717/104 |
| 7,694,287 | B2 | 4/2010 | Singh et al. |
| 7,805,713 | B2 * | 9/2010 | Patel ............................ 717/143 |
| 2002/0083210 | A1 * | 6/2002 | Harrison et al. ............. 709/310 |
| 2002/0091844 | A1 | 7/2002 | Craft et al. |
| 2002/0116530 | A1 | 8/2002 | Burgess |
| 2002/0141449 | A1 | 10/2002 | Johnson |
| 2003/0055768 | A1 * | 3/2003 | Anaya et al. ................... 705/36 |
| 2003/0093479 | A1 | 5/2003 | Mellen-Garnett et al. |
| 2003/0153338 | A1 | 8/2003 | Herz et al. |
| 2003/0158951 | A1 | 8/2003 | Primak et al. |
| 2003/0163585 | A1 | 8/2003 | Elderon et al. |
| 2003/0169749 | A1 | 9/2003 | Huang et al. |
| 2003/0187996 | A1 | 10/2003 | Cardina et al. |
| 2003/0210694 | A1 | 11/2003 | Jayaraman et al. |
| 2003/0221000 | A1 | 11/2003 | Cherkasova et al. |
| 2003/0223408 | A1 | 12/2003 | Chen et al. |
| 2004/0039693 | A1 | 2/2004 | Nauman et al. |
| 2004/0153511 | A1 | 8/2004 | Maynard et al. |
| 2004/0172254 | A1 | 9/2004 | Sharma et al. |
| 2004/0254922 | A1 * | 12/2004 | Vincent, III ...................... 707/3 |
| 2004/0268296 | A1 * | 12/2004 | Kayam et al. ................. 717/104 |
| 2005/0050203 | A1 | 3/2005 | Chattopadhyay et al. |
| 2005/0050549 | A1 | 3/2005 | Joseph et al. |
| 2005/0080850 | A1 | 4/2005 | Salesky et al. |
| 2005/0138002 | A1 * | 6/2005 | Giacobbe et al. .................. 707/3 |
| 2005/0138632 | A1 | 6/2005 | Groetzner et al. |
| 2005/0193078 | A1 | 9/2005 | Jordan, Jr. |
| 2005/0273772 | A1 * | 12/2005 | Matsakis et al. ............. 717/136 |
| 2005/0278270 | A1 | 12/2005 | Carr et al. |
| 2006/0013367 | A1 * | 1/2006 | Sawyer et al. ............. 379/88.01 |
| 2006/0080120 | A1 | 4/2006 | Tcherevik |
| 2006/0117307 | A1 * | 6/2006 | Averbuch et al. ............. 717/143 |
| 2006/0155722 | A1 * | 7/2006 | Sengupta ...................... 707/100 |
| 2006/0167818 | A1 | 7/2006 | Wentker et al. |
| 2006/0206864 | A1 * | 9/2006 | Shenfield et al. ............. 717/107 |
| 2006/0242085 | A1 | 10/2006 | Jones et al. |
| 2007/0067760 | A1 * | 3/2007 | Andrew et al. ............... 717/143 |
| 2007/0276765 | A1 | 11/2007 | Hazel et al. |
| 2008/0147565 | A1 | 6/2008 | Huang et al. |

FOREIGN PATENT DOCUMENTS

| | | |
|---|---|---|
| JP | 2004303205 A | 10/2004 |
| RU | 2222046 C2 | 1/2004 |
| RU | 2249848 C2 | 4/2005 |
| WO | 2004/036855 A2 | 4/2004 |
| WO | 2005/043413 A1 | 5/2005 |

OTHER PUBLICATIONS

P. Resnick, Internet Message Format, Apr. 2001, 45 pages.*

"Design and implementation of the parallel multimedia file system based on message distribution", Park et al., Oct. 2000, pp. 422-425. Online retrieved at <http://delivery.acm.org/10.1145/380000/376325/p422-park.pdf>.

"Performance analysis framework for large software-intensive systems with a message passing paradigm", C. D. Rosso, Mar. 2005, pp. 885-889. Online retrieved at <http://delivery.acm.org/10.1145/1070000/1066878/p885-del.sub.—rosso.- pdf>.

"Virtual machines for message based, real-time and interactive simulation", Kim et al., Dec. 2000, pp. 1529-1532. Online retrieved at <http://delivery.acm.org/10.1145/520000/510603/p1529-kim.pdf>.

Search/Examination Report dated Mar. 3, 2011 from Russian Patent Application No. 2008103282, 11 pages.

Supplementary European Search Report of EP Patent Application No. 06774431.8, mailed Dec. 16, 2011, 5 pages total.

Non-final rejection dated Jul. 27, 2012 from Korean Patent Application No. 10-2008-7002321 together with English language translation, 10 pages.

English Translation of Office Action mailed Sep. 26, 2012 in Japanese Patent Application No. 2008-519670, 3 pages.

* cited by examiner

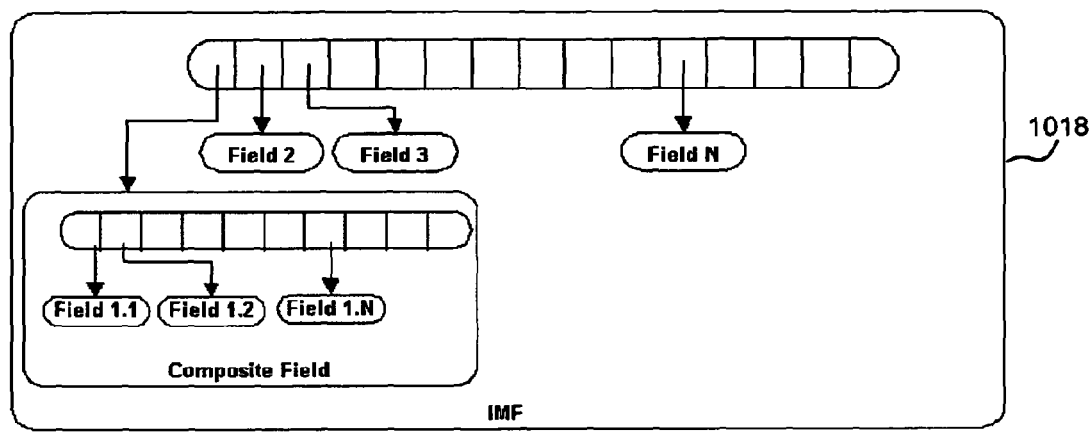

*Fig. 13A*

Schema

MessageDef{ 1000, ISO, 154 }

```
FieldDef {1.0.0, HDR ,            REQUIRED ,  FIXED:BINARY(22) ,  RAW,      CUSTOM ,     ISOHEADER , 14}
FieldDef {1.1.0, HDR_LEN,          REQUIRED ,  FIXED:BINARY(1),    N,        NOTCUSTOM ,  NULL,        0}
FieldDef {1.2.0, HDR_FORMAT,       REQUIRED ,  FIXED:BINARY(1) ,   BITSTRING,NOTCUSTOM ,  NULL ,       0}
FieldDef {1.3.0, HDR_TEXT,         REQUIRED ,  FIXED:BINARY(1),    N,        NOTCUSTOM ,  NULL ,       0}
FieldDef {1.4.0, HDR_MSG_LEN,      REQUIRED ,  FIXED:BINARY(2),    N,        NOTCUSTOM ,  NULL ,       0}
........
........
FieldDef {1.13.0, HDR_BMA,          OPTIONAL ,  FIXED:BINARY(2),    BITSTRING,NOTCUSTOM,   NULL,        0}
FieldDef {1.14.0, HDR_REJECT_GROUP, OPTIONAL ,  FIXED:PACK_BCD(2) , N,        NOTCUSTOM,   NULL,        0}
........   1202       1204          1206           1208           1210        1212         1214      1216
```

*Fig. 13B*

Message 1010

| 1.0.0 | 1.1. | 1.1.1 | 2.0.0 | 2.2.0 | 4.0.0 | 4.1.0 |

SCHEMA-BASED DYNAMIC PARSE/BUILD ENGINE FOR PARSING MULTI-FORMAT MESSAGES

CROSS-REFERENCES TO RELATED APPLICATIONS

This application is a continuation of U.S. patent application Ser. No. 11/172,397, now U.S. Pat. No. 7,694,287, filed on Jun. 29, 2005, which is herein incorporated by reference for all purposes. This application is related to U.S. patent application Ser. No. 11/171,516, now U.S. Pat. No. 7,774,402, filed on Jun. 29, 2005, entitled "ADAPTIVE FRONT END GATEWAY FOR SWITCHING TRANSACTIONS AND DATA ON UNRELIABLE NETWORKS USING CONTEXT-BASED RULES," which is hereby incorporated herein by reference for all purposes.

BACKGROUND OF THE INVENTION

The present invention generally relates to parse/build engines and more specifically to a high performance and yet very flexible parse/build engine capable of translating multi-format message streams into an internal message format for processing and translating the internal message format back to the multi-format message streams where formats that can be translated may be dynamically added to the parse/build engine.

Applications need to communicate with other heterogeneous systems when performing tasks. These heterogeneous systems may use data in a format that is different from the internal format of the host application. In order to be able to process information received in the different data format, the host-application may have to parse the external data format to its own internal data format. The host application can then process the parsed information in the internal data format. After processing, the processed information is then built into the external data format. Accordingly, the software application can then effectively communicate with external heterogeneous systems that process data in a different data format than the internal data format used by the software application.

Conventionally, parse/build engines are used for the parse and build steps described above. The engines are generally one of two types, interpreter-based parse/build engines and compiled parse/build engines.

Interpreter-based parse/build engines can handle multiple data formats. The interpreter-based parse/build engines include a large grammar dictionary that is used to interpret a certain set of messages. Accordingly, multiple data formats can be handled, but at the cost of performance because using the grammar dictionary is often very complex and translating messages using it degrades performance. Another drawback with the interpreter-based parse/build engines is they can only interpret the certain set of messages included in the grammar dictionary. If additional definitions in the grammar dictionary need to be added, the engine typically has to be recompiled in order to use the new definitions for the grammar dictionary.

Compiled parse/build engines are customized for high performance for a fixed set of data formats. But compiled parse/build engines cannot support new data formats dynamically. They require code changes to incorporate the new data formats that may be necessary to support new business requirements. The code changes must then be recompiled. Thus, compiled parse/build engines are not a good fit for systems that need to handle new message types dynamically and cannot be brought down for re-compiling.

BRIEF SUMMARY OF THE INVENTION

The present invention provides a parse/build engine that can handle multi-format messages. The engine converts the messages in different formats into a common format, and the common format message is then processed by a business service application. The common format is a canonical message format that is referred to as an internal message format herein. A parser examines the message and determines an appropriate schema for the particular format of message received. The schema is a data structure in a schema registry that includes a grammar structure for the received format as well as pointers to handlers for converting the different fields of the message into the internal message format using the grammar structure (the "grammar" can include field sequence, field type, length, character encoding, optional and required fields, etc.). The handlers are individually compiled. Thus, rather than compiling the overall system, the handlers are separately compiled, giving the speed of compiled software while retaining a modular system that can be easily upgraded without disturbing other elements of the engine. As formats change, new formats or changes to old formats can be dynamically added to the parse/build engine by loading new schema and handlers.

In one embodiment, the parser can load a root schema corresponding to the format of message detected, such as an ISO 8583 financial message. The root schema would point to a handler which determines what type of message has been received (e.g., authorization message, reconciliation message, etc.). The parser then loads the schema for the message type identified, which in turn provides the particular grammar and points to the handlers for that message type. Thus, the entire grammar and handlers for all types of financial messages need not be loaded, only the subset actually needed, thus limiting the memory needed and improving performance. In addition, for each message type, schema and handlers are loaded and called only for the fields actually present. This is made possible by the modular structure and iterative approach of the invention.

In one embodiment, in addition to only loading the schema, grammar and handlers that are actually needed, the parse/build engine uses a fast indexing system for the internal message format. This indexing system uses encoded object IDs in the schema, which, for each field used in the received format, index into (point to) the corresponding field of the internal message format. Fields of the internal message format that aren't used are not pointed to and thus don't need to be accessed. The indices can point to fields that are several layers down in a hierarchical structure. By using the indices, instead of sequentially processing all the fields, a speed advantage is provided.

In one embodiment, a business service application processes the message in the internal message format. As a result of the processing, the business service application may update or add fields (e.g., a time stamp, preprocessing tasks such as calculating a risk score, etc.). The modified message then undergoes the reverse of the parsing operation, a build operation. The build operation similarly uses schema and handlers to build the message into a desired external format for return to the originator, or forwarding onto another destination for processing. The business service application is separate from the parse build engine, thus changes to the parse build engine need not affect the business services application.

A further understanding of the nature and the advantages of the inventions disclosed herein may be realized by reference of the remaining portions of the specification and the attached drawings.

BRIEF DESCRIPTION OF THE DRAWINGS

FIG. 13A depicts a structure for an IMF object according to one embodiment of the present invention.

FIG. 13B depicts attributes for a message definition according to one embodiment of the present invention.

DETAILED DESCRIPTION OF THE INVENTION

Figure 1:
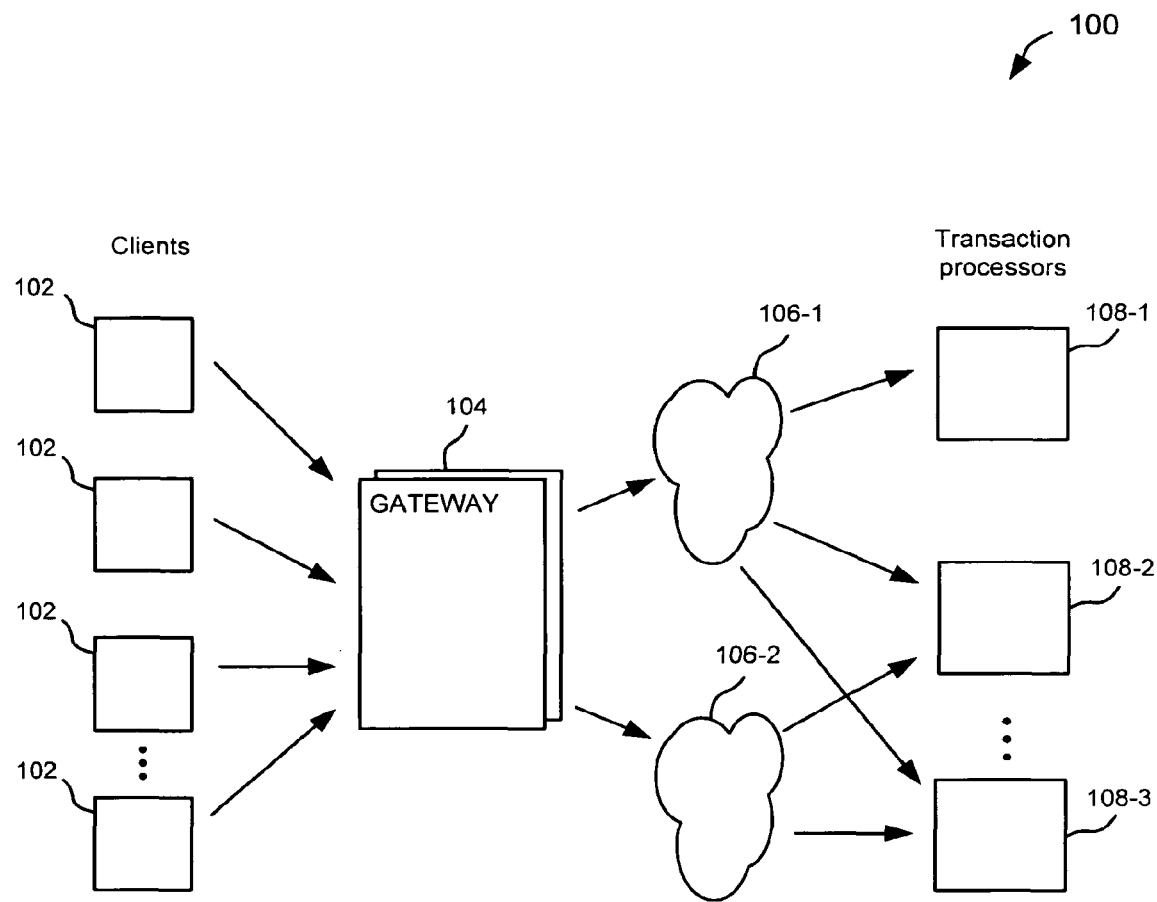
FIG. 1 depicts a system for processing transactions according to one embodiment of the present invention.

Embodiments of the present invention relate to the parse/build of messages. A gateway that may incorporate a parse/build engine according to an embodiment of the present invention is described first. The parse/build engine is then described in more detail.

The Gateway
Processing Overview

In one embodiment, intelligent switching of transactions is provided. A transaction may be a credit card authorization, debit card transaction or an electronic check transaction. Other examples of transactions include awarding of points or other rewards in an awards program, checking a password for a Verified by Visa authentication, doing a money transfer, deducting a payment from a prepaid card, such as a Visa Buxx card or a salary card, handling a proximity payment from a cell phone, pager, PDA, etc., determining coverage under health, auto, or other insurance, etc. A client sends a transaction to a gateway, which is then configured to intelligently switch the transaction to a transaction processor of a service provider. The client could be a POS, a merchant computer networked to POS devices or ECRs (electronic cash registers), a kiosk (such as for coupons or money transfer), an Internet web site server, etc.

The gateway is configured to make switching decisions at the application level based on the application level content of the transaction, a current state of a transport environment, and/or dynamic rules. The application level content may be information that is processed or used by a transaction processor in processing the transaction. In one embodiment, the information may be OSI layer7 information. This layer directly serves the transaction processor or end user. It includes applications such as credit card authorization, debit card transaction applications, etc. Example application layer protocols are FTP (File Transfer Protocol), NFS (Network File System), CLFS (Common Internet File System), HTTP (Hyper Text Transfer Protocol), database query, SQL (Standard Query Language), and XML (Extensible Markup Language). For example, in a credit card authorization, application level content may include the credit card number, personal account number (PAN), a customer account number, a total amount for the transaction, etc. The transaction processor may use this information in order to process the transaction.

The current state of the transport environment includes real-time information associated with networks that can transport the transaction and transaction processors that may process the transaction. The real-time information may include the health of a network or transaction processor, the availability of a network or transaction processor, the application processing speed of a transaction processor, etc.

The dynamic rules may be information that is used to decide how to intelligently switch the transaction. The rules are used to switch the transaction according to the application level content and the current state of the transport environment. For example, the rules may specify that, depending on certain application level content and the current state of the transport environment, a certain service offered by a service provider should be selected. Further, the rules may be used to select a transaction processor for the service provider to process the transaction. For example, certain countries may require local processing for domestic transactions, thus requiring routing to a regional processing center. These rules may also factor in static information, such as network costs, service costs, etc. in order to make a selection. The rules may be dynamically changed without taking down a gateway.

The gateway may also perform services on the transaction according to the rules. The services may include processing the application level content. For example, transaction processors may be configured to process a transaction in different formats. A selected transaction processor may be configured to process application level content in a different format from the application level content currently in the transaction.

Thus, the gateway may change the application level content to the new format so the selected transaction processor can process it. Accordingly, the gateway may change information in a transaction at the application level. This is different from reviewing information at the packet level. Conventionally, a transaction may be broken up into packets. A router may look at information in the packet and route the packet accordingly. Looking at information at the packet level, however, does not allow the router to perform services using the application level content for the transaction. For example, by looking at the application level content for the full transaction, the transaction may be intelligently routed with appropriate services applied to the transaction. If individual packets carrying information for the transaction are processed individually, the application level content of the transaction as a whole is not processed.

Accordingly, a gateway is provided that intelligently switches a transaction at the application level based on the application level content, current state of a transport environment, and/or dynamic rules. The gateway may also provide services that are applied based on the switching decision.

System Overview

FIG. 1 depicts a system 100 for processing transactions according to one embodiment of the present invention. As shown, system 100 includes one or more clients 102, one or more gateways 104, one or more networks 106, and one or more transaction processors 108. The following description will be described with respect to a single gateway 104, but it will be understood that multiple gateways 104 may be provided to perform any functions described below. Also, although the gateways are shown adjacent the clients, gateways may also be deployed adjacent the transaction processors, between the transaction processors and the networks 106.

Clients 102 include any system configured to send a transaction. For example, clients 102 may include a system of computing devices that perform transactions with users. In one example, clients 102 may include a point of sale (POS) device that receives user information, such as credit card information, a pin number, name, etc., for a credit card authorization, check card transaction, etc. A client could also be a kiosk in a store for checking points or coupon information, or a kiosk for money transfer, or a node for receiving wireless user input from a cell phone or other device, or a web site server, etc. The client could also be a merchant server through which POS devices are networked.

The client (e.g., POS device) may then send a transaction that requests a transaction service from a transaction processor 108. A transaction service may be any actions that may be performed by a transaction processor 108. In one embodiment, these transaction services add value for transactions being performed by clients 102. Examples of transaction services include facilitating credit card authorizations, debit card transactions, electronic check transactions, etc. A transaction service may also include processing a transaction or exchanging data.

Gateway 104 includes a system configured to receive transactions from clients 102 and to route the transactions to transaction processors 108 through networks 106. In one embodiment, gateway 104 is situated on the edge of a network 106. For example, gateway 104 may be at the point of access for client 102 or be on the premises of client 102. The edge of network 106 may be a point where transactions may be configured for routing through network 106. For example, gateway 104 may select a transaction processor 108 and send the request to a router of network 106. The transaction may be broken up into a number of packets. The router would then route the packets for the transaction through network 106 to transaction processor 106.

Networks 106 may be any network configured to transfer data. For example, networks 106 may include any packet-based networks, public switched telephone networks (PSTNs), wireless networks, the Internet, private financial networks, etc.

In one embodiment, networks 106 may be disparate and/or unreliable networks. The networks are disparate in that they may be controlled by different entities, may route data using different protocols and formats, may route data using different transport methods, etc. For example, networks 106 may be controlled by different entities. In one example, a first Internet Service Provider (ISP) may maintain a network 106-1 and a second Internet Service Provider may maintain a network 106-2. Transactions may be routed through either network 106-1 or network 106-2 in one embodiment.

Also, networks 106 may be of different types. For example, a network 106-1 may be an asynchronous transfer mode (ATM) network that routes packets of data. Another network 106-2 may be a wireless network that transmits data wirelessly. Further, another network 106 may be a private network for an entity, such as the VisaNet network. Although only two networks 106 are shown, it will be understood that many more networks 106 may be provided. Also, it will be understood that transactions may be routed through multiple networks 106. For example, transactions may be routed through network 106-1, then network 106-2, and then to a transaction processor 108.

Networks 106 may also be unreliable. Because of the nature of networks, they may fail at any time. Thus, failover processing is needed to avoid disruptions in transaction processing.

Service providers may register and publish services that can be offered to clients 102. Clients 102 may register for the services and have transactions switched to the service providers. Service providers may have any number of transaction processors 108 that are configured to provide the services to clients 102. In one embodiment, transaction processors 108 process financial transactions. For example, transaction processors 108 may be associated with issuers, acquirers, merchants, or any other service provider. In one example, transaction processors 108 facilitate the authorization of credit card transactions.

A service may be provided by more than one transaction processor 108. For example, a service provider may have many data centers that can provide a service to a client 102. Thus, a transaction for the service may be switched to any of the transaction processors 108 that can provide the service. The transaction processor 108 may be selected by gateway 104 based on application level content, context information for a transport environment, and/or dynamic rules, all of which may be dynamically changing.

The application level services may be dynamically changed. Services available may be modified, moved to another processor, be unavailable due to maintenance or failure, etc.

The context information for the transport environment may also be dynamically changing. Gateway 104 thus determines the context information for the transport environment when determining how to switch a transaction. For example, a current state of the health of a network 106, the availability of a network 106, the availability of a transaction processor 108, the speed that data is being transferred through a network 106, the cost of transferring a transaction through a network 106, the cost of processing a transaction, how long an application is taking to process a transaction at the application level, etc. may be determined.

In addition to the dynamic information for the context information for the transport environment, certain relatively static information may be determined. For example, static information may be the cost of a transaction, the format needed in order for a transaction processor 108 to process a transaction, etc. Gateway 106 may use the dynamic and static information in determining how to route a transaction.

The dynamic rules may be information that is used to decide how to intelligently switch the transaction. The rules may be dynamically loaded. For example, a service provider may register rules for a service, which be dynamically loaded onto gateway 104. Also, a client may subscribe to the service and provider rules for switching its transactions to the service provider. These rules may also be dynamically loaded onto gateway 104.

Accordingly, gateway 104 can dynamically select a transaction processor 108 for a service that can process a transaction. Business services particular to a selected transaction processor may also be performed on the transaction, such as the transaction may be formatted such that the selected transaction processor 108 can process it. The transaction can then be sent through a selected network 106 to the selected transaction processor 108. By dynamically selecting transaction processors 108 and/or networks 106, gateway 104 insulates clients 102 from any failures of transaction processors 108 and/or networks 106. Accordingly, this provides extremely high service availability. Gateway 104 insulates a client 102 from any changes that need to be made that may cause downtime for a transaction processor 108.

Overview of Gateway 104

Figure 2:
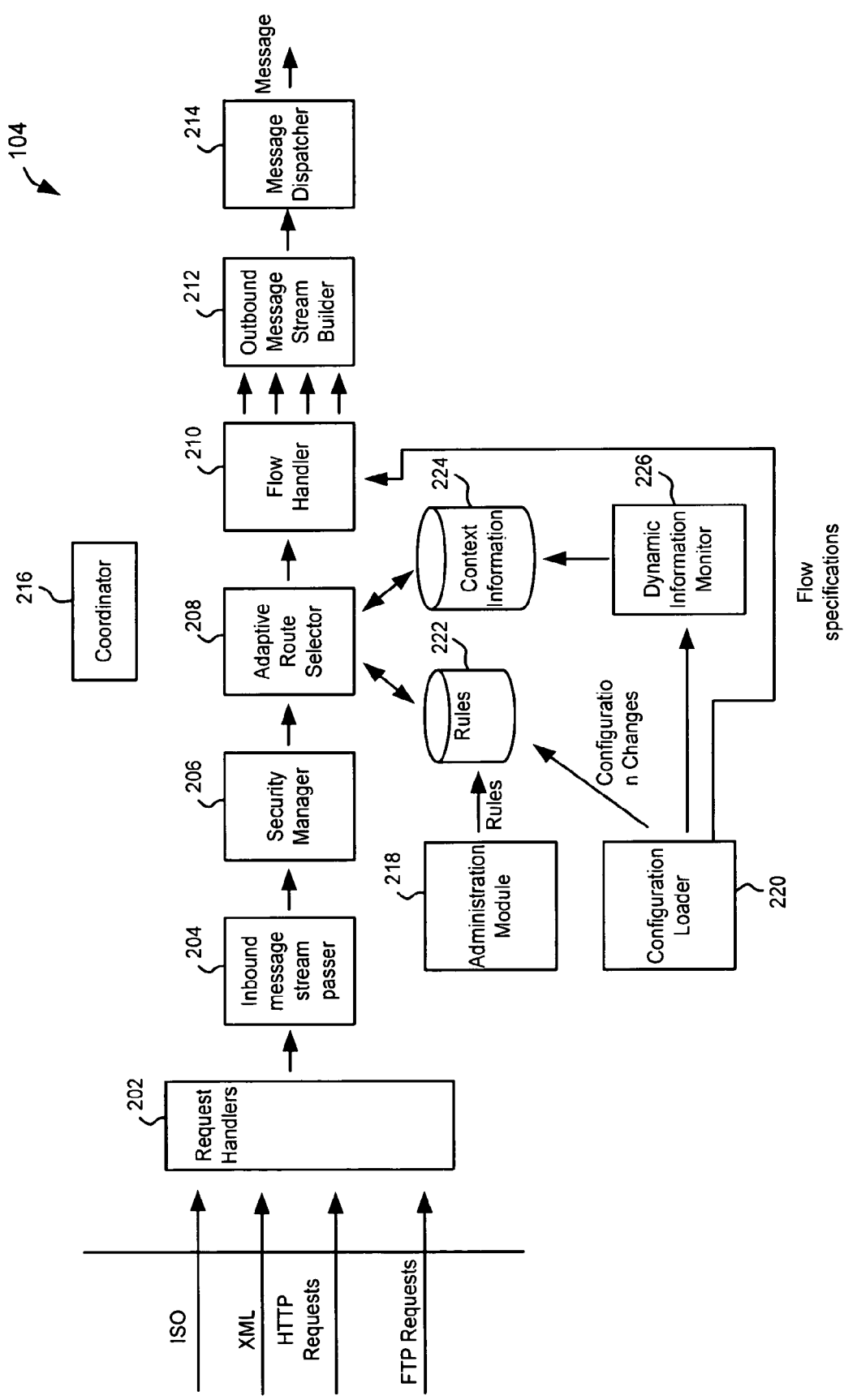
FIG. 2 depicts a more detailed embodiment of a gateway according to one embodiment of the present invention.

FIG. 2 depicts a more detailed description of gateway 104 according to one embodiment of the present invention. As shown, gateway 104 includes one or more request handlers 202, an inbound message stream parser 204, a security manager 206, an adaptive route selector 208, a flow handler 210, an outbound message stream builder 212, a message dispatcher 214, a coordinator 216, an administration module 218, a configuration loader 220, a rules database 222, a context information database 224, and a dynamic information monitor 226.

Request handlers 202 are configured to receive transactions from clients 102. Clients 102 may send transactions in different protocols and formats, such as hypertext transfer protocol (HTTP), file transfer protocol (FTP), extensive markup language (XML), ISO 8583 standards, etc. Request handlers 202 provide an interface for transactions sent in various protocols and formats, and provide the transactions to inbound message stream parser 204. For example, an ISO message handler is configured to receive ISO 8583 requests from clients 102 and pass them to inbound message stream parser 204. Also, an XML message handler, an HTTP request handler, and an FTP request handler can handle XML, HTTP, and FTP messages and/or requests. Accordingly, request handlers 202 allow gateway 104 to receive messages in different protocols and formats. Although the above formats and protocols are described, it will be understood that a person skilled in the art will appreciate other formats and protocols that request handlers 202 may process.

Inbound message stream parser 204 is configured to receive a transaction from request handlers 202 and convert the request into a canonical form. Inbound message stream parser 204 can receive messages in different formats and process those requests into a canonical format that can then be processed by other components of gateway 104. Accordingly, transaction requests in many different formats may be processed by gateway 104. Inbound message stream parser 204 also provides an extensible architecture in that new formats that may be processed by gateway 104 may be enabled. If a new format is added, the translation from the new format to the canonical format is added to inbound message stream processor 104. Thus, because the canonical format is used, changes to all components in gateway 104 are not needed when new formats are added. Rather, inbound message stream parser 204 is configured to parse a request into a canonical format that can be processed by other components of gateway 104. Further details of inbound message stream parser 204 can be found in below.

Security manager 206 is configured to provide security features for the transactions. For example, security features such as pluggable authentication and authorization, role-based access control (RBAC), encryption, file integrity, etc. may be provided. The pluggable authentication and authorization feature provides a standard interface for authentication and authorization and hence allows newer methods of authentication and access control to be added without impacting existing methods. A person skilled in the art will appreciate other security features that may be added to transactions.

An adaptive route selector 208 is configured to switch a transaction to a transaction processor 108 through a network 106. Adaptive route selector 208 switches the transaction based on application level content, the current state of a transport environment, and/or dynamic rules.

Adaptive route selector 208 uses rules found in rules database 222 and dynamic context information found in context information database 224 to route a transaction. As mentioned above, context information may be stored in context information database 224. In one embodiment, the context information may be dynamic. A dynamic information monitor 226 may monitor and determine context information. The dynamic information is then stored in context information database 224. Examples of context information include the availability of networks 106, the health of transaction processors 108, a cost per transaction, time taken for an application to process previous transaction at the application level, etc. In one embodiment, dynamic information monitor 226 may determine dynamic context information at run-time when a transaction is received. In another embodiment, dynamic information monitor 226 may determine dynamic context information at certain intervals.

Each different service performed by transactions processors 108 may specify probes that can be performed by dynamic information monitor 226. The probes are sent and allow information to be collected based on the status of a transaction processor 108 and/or network 106. For example, dynamic information monitor 226 may ping a network in order to determine if the network is available. If the transaction processor 108 or network 106 cannot be reached, it may be considered unavailable and status information is reflected in context information database 224. If all transaction processors 108 for a service cannot be reached, then the service may be considered unavailable. Gateway 104 may determine another service provider that provides the service in this case. Also, the time it takes an application on a transaction processor 108 to process a transaction may be measured. For example, how long the application takes to authorize a credit card authorization is measured. This measurement provides application level context that can be used to switch a transaction.

Rules database 222 includes rules for determining a service for a transaction in addition to a network 106 and processor 108 to process the transaction. The rules may also express criteria for a client. For example, in order for a service to be selected, certain context information and application level content should be satisfied for the rules. Clients may provide client-specific rules that may be used to select a service for the transaction. In one example, when a transaction is received for a client 102, adaptive route selector 208 may determine a client's specified selection rules and determine a service that can handle the transaction. In order to switch the transaction to a service provider that provides the service, application level content is determined from the transaction and/or dynamic context information is determined from context information database 224. The application level content and/or context information is applied to the rules to determine a service provider that can process the transaction according to the rules. For example, based on certain factors, such as costs, clients 102 may specify that the cheapest service should be selected first, but if not available, a second more expensive service should be selected. Also, based on application level content, such as account numbers, transactions may be switched to a certain credit card service. For example, certain account numbers may indicate a credit vs. debit card, or that a particular points or awards system applies. Other account numbers or fields could indicate a need for other services, such as money transfer or password verification (e.g., Verified by Visa). Also, the application level content may include the location of the client and any regional or country-specific regulations that dictate if the transaction needs to be processed locally or sent to a processor 108 in a different country.

The services may also include a service specification that specifies rules for the service. For example, the rules may specify the message format required for transactions, the network addresses of transaction processors 108 that provide the service, preferences for switching transactions to transaction processors 108, the range of account numbers that qualify for the service, etc. These rules are provided by a service provider upon registration, as discussed in more detail below. The service provider may directly load the rules on gateway 104, which would then publish the rules to other interested gateways.

The rules may specify flows that can process the transaction. The flows handle processing of the transaction for sending to a transaction processor 108. The message is then sent to a selected flow handler 210. After the transaction processor 108 and network 106 are selected, flow handler 210 may perform business services on the transaction. For example, different transaction processors 108 may process transactions in different formats. Flow handler 210 may determine the appropriate format for the selected transaction processor 108 and format the transaction in that format. Other business services may include currency-conversions, encrypting sensitive fields, client side stand-in processing for transaction values below a certain threshold, etc.

Flow handler 210 may include a plurality of flows. Each flow may handle a set of business services that process a class of messages. Each flow includes a flow handler that coordinates all the business services in the flow. A sequence of services within a flow is specified by a flow specification, which can be loaded at run time using configuration loader 220. The flow specification is the sequence of services that determines how the incoming message is handled. Each service is a software application code that performs a specific function. New services and flow specifications can be loaded dynamically to gateway 104.

After flow handler 210 processes the transaction in a flow, the message is sent to an outbound message stream builder 212. Builder 212 is configured to build an outbound message from a canonical format based on a message form expected by the determined transaction processor 108. Builder 212 is thus configured to generate a message in any message format based on the canonical message format. Outbound message stream builder 212 is described in more detail below.

Message dispatcher 212 is configured to send a transaction to a transaction processor 108. Dispatcher 214 may ensure that a transaction reaches the selected transaction processor 108. It may manage connections to various transaction processors 108, attempt to reconnect to failed transaction processors 108, and also provide the status of transaction processors 108 and networks 106 to dynamic information monitor 226. In one embodiment, the transaction may be packetized, i.e., broken up into a series of packets and sent to a router. The router may route the packets through network 106 to the transaction processor 108.

A coordinator 216 is provided to coordinate the processes of gateway 104 and to ensure transactions are properly processed. Also, coordinator 216 provides services for application management, software distribution, system monitoring and failover capabilities to gateway 104. Application management supports starting and stopping of applications and services locally and remotely. It also allows new applications and services to be added to gateway 104. Software distribution enables software updates to be installed on gateway 104, and includes support for rolling back updates if necessary. System monitoring service monitors key parameters of system components such as memory, CPU, network interfaces, and processes, and generates alerts if the configured parameters deviate from threshold values. It also restarts a process if it detects a process failure. Coordinator 216 also monitors the health of a peer gateway 104 using a heart-beat mechanism (in case of a multi-gateway cluster deployment), and takes over the processing load of the peer gateway 104 if the peer gateway 104 fails.

Dynamic Loading of Rules

After initial registration of a service (described below), the rules and business services performed by gateway 104 may be dynamically changed. Administration module 218 and configuration loader 220 are configured to dynamically load changes to rules database 222 and flow handler 210.

Configuration loader 220 is configured to load a configuration changes, routing rules, new flow specifications, etc. into rules database 222 at run time. Accordingly, configuration loader 220 allows the dynamic reconfiguration of routing rules in rules database 222. The rule-base maintains multiple versions of the rule-objects and has a synchronized reference to the current version of the rule-base. Before configuration loader 220 loads updates to the rule-base, it creates a shadow copy of the active rule-base and versions it. Then, for every object that is updated, it creates a new instance of the object and updates the reference in the new version of the rule-base. When all the updates are completed, it changes the reference to point to the new version of the rule-base.

Administration module 218 is configured to allow for administrative actions to be performed. Administration module 218 may be used by a user agent to administer one or more gateways 104. For example, administration module 218 may be used to define new rules into rule database 222 or change routing rules dynamically. Also, administration module 218 may also be used to load and unload new flow specifications for flow handler 210, start and stop business services, and load and unload configurations. Configuration loader 220 is then configured to perform the changes.

The dynamic changes of embodiments of the invention are made possible by the combination of modularization of services and the run-time invocation of services for processing messages through a flow (e.g., see description of flows above). When a new transaction is received by adaptive route selector 208, it reads the current version of the rule-base and applies the rules to select the appropriate flow. Since the flow handler 210 uses a specific version of a flow for the entire life of the transaction, and each flow specification refers to a specific versions of services, flows and rules. Thus, they can be updated without interfering with an existing transaction at that time because the updates are effected in a different version than the version being currently used by existing transactions.

Processing of a Transaction

Figure 3:
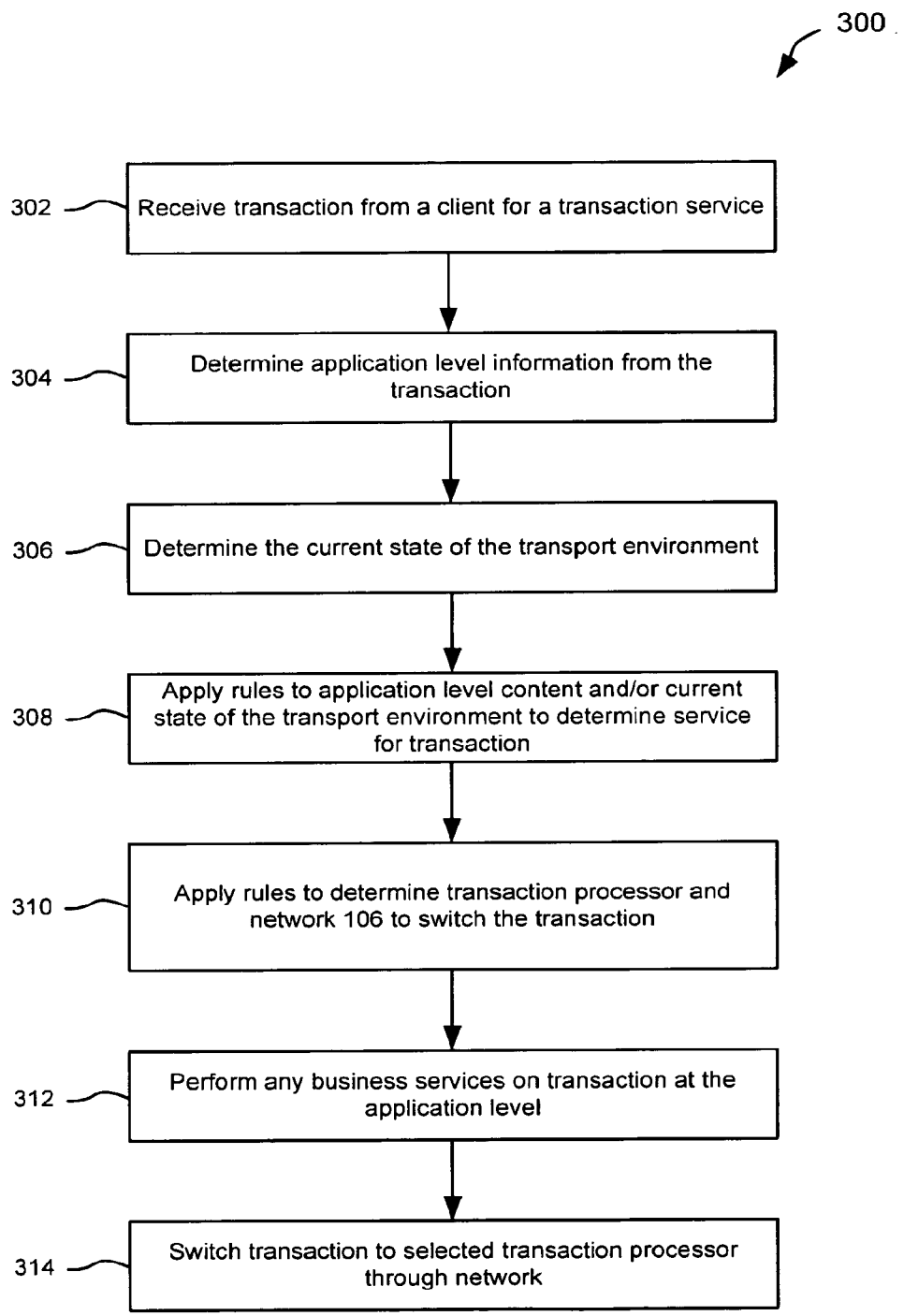
FIG. 3 depicts a simplified flowchart of a method for processing a transaction according to one embodiment of the present invention.

FIG. 3 depicts a simplified flowchart 300 of a method for processing a transaction according to one embodiment of the present invention. In step 302, a transaction is received from a client 102. The transaction may be any type of transaction such as credit card authorization, check card transaction, etc.

In step 304, application level content is determined for the transaction. As mentioned above, the application level content is used to process the transaction. For example, the application level content may be credit card number, PIN, the name of a member bank (enquirer or issuer), etc. The application level content may be considered as a whole. For example, if the transaction was packetized into a number of packets, the application level content may be found in a payload of multiple packets. This information may be reassembled into the application level content for the transaction.

In step 306, the current state of the transport environment is determined. For example, the health of a transaction processor that can provide the services determined. Further, the network health for networks 106 that can route the transaction may also be determined. This information may be determined in real-time to provide the current state of the transport environment.

In step 308, rules are applied to the application level information and/or current state of the transport environment to determine a service. For example, certain clients 102 may be associated with certain services. A processor host such as Visa may desire that its transactions be switched to transaction processors 108 that are owned by Visa. Further, other processor hosts may desire that their transactions be switched to a secondary transaction processor, such as Vital.

In step 310, rules are applied to determine a transaction processor and/or network 106 in which to switch the transaction for the service. This decision may be determined based on the application level content and/or the current state on the transport environment as applied to the rules. For example, a service to process the transaction is determined. Then, an applicable transaction processor 108 is determined based on network availability.

Also, a service may also be associated with various transaction processors 108 and networks 106. For example, credit card authorizations may be configured to be sent to certain transaction processors 108. Further, check card transactions may be configured to be sent to a second set of transaction processors 108. These rules are determined for the client and/or transaction service.

In step 312, any business services may be performed at the application level on the transaction as required. For example, a transaction may be formatted into a format expected by the selected transaction processor 108, any information at the application level may be added to the transaction, or any other business services may be performed.

In step 314, the transaction may be switched to the selected transaction processor 108 through network 106.

Alternatively, in another embodiment, gateway 104 is configured to process the transaction without switching the transaction to a service provider. A service provider may specify rules that state gateway 104 can process transactions if certain criteria are met. For example, if the transaction is lower than a certain amount. In one example, credit card transactions less than a threshold amount could be approved, not only without having to go to the bank for approval, but also without having to go over network 106 to a credit card company. This offers many advantages as transactions can be processed at the edge of the network. This eliminates network bottlenecks and provides a decentralized processing system.

Service Creation and Subscription

Figure 4:
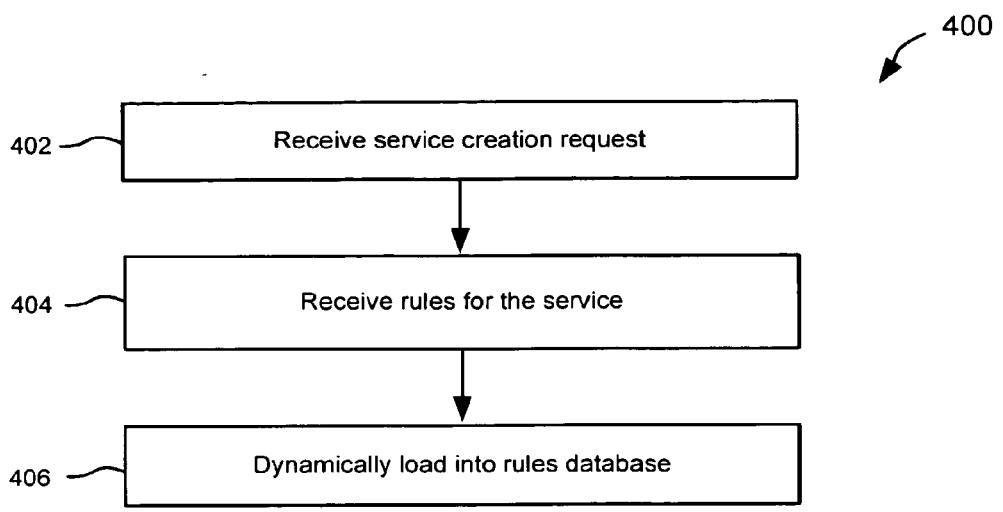
FIG. 4 depicts a simplified flowchart for generating configuration information for a service offered by a transaction processor according to one embodiment of the present invention.

As mentioned above, rules may be dynamically loaded into rules database 222. FIG. 4 depicts a simplified flowchart 400 for loading rules in gateway 104 for a service offered by transaction processor 108 according to one embodiment of the present invention. In step 402, a service creation request is received. For example, a service provider may try to register a service by sending a service creation request that specifies a service that is being offered by the service provider. Alternately, a gateway 104 associated with a transaction processor or other service provider may dynamically advertise new services, and a gateway associated with a client can determine whether to initiate a registration for those new services. A new service might be a money transfer service, a new points program, etc.

In step 404, rules for the service are received. For example, the rules may specify addresses for transaction processors 108 that can process the service. The network addresses may be IP addresses or any other identifiers that can be used to route transactions to transaction processors 108. Additionally, information for networks 106 that can be used to route the request to the transaction processors 108 may also be received. The rules may also specify criteria for using the service. For example, criteria specifying the format messages are expected to be received in, the costs of using the service (both fixed and per-transaction costs), and any other criteria for using the service may be received. The rules could specify which types of cards, or types of accounts or account number ranges qualify or are registered for the service.

In step 406, rules for the service are dynamically loaded into rules database 222 by administration module 218 using configuration loader 220. Further, any flow specifications that are needed to process transactions for the service may be loaded into flow handler 202.

Figure 5:
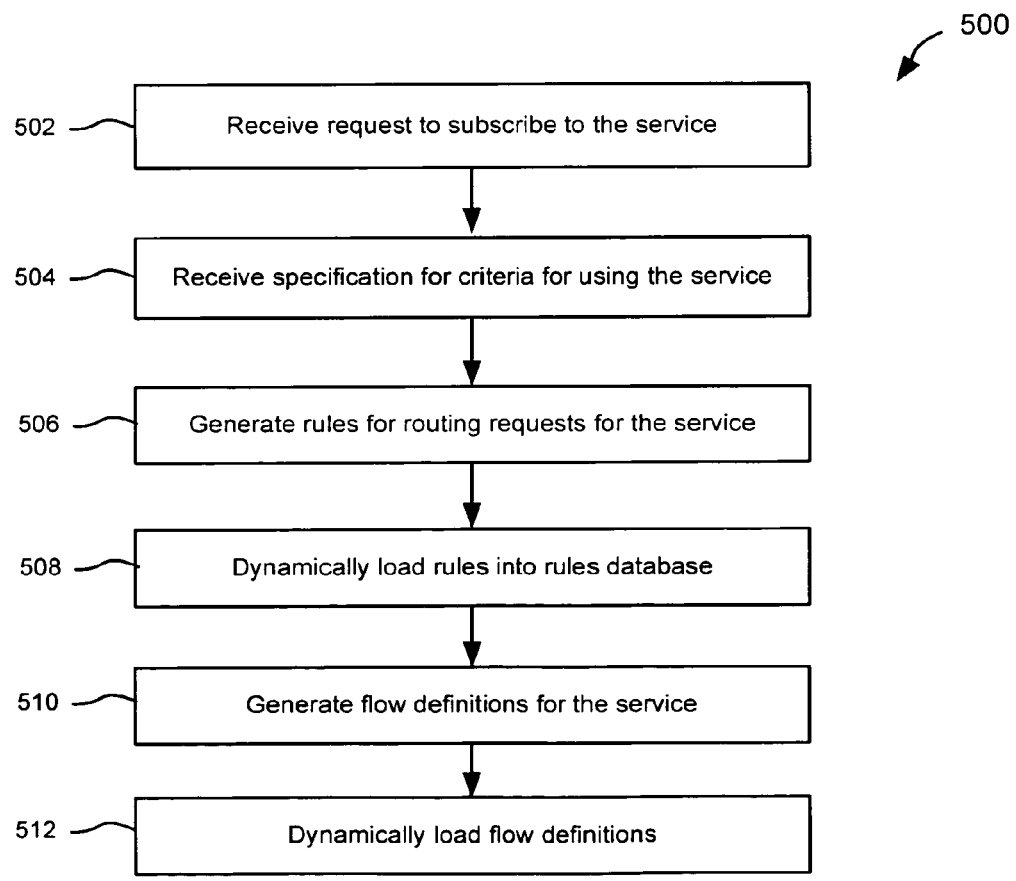
FIG. 5 depicts a simplified flowchart of a method for subscribing to a service according to one embodiment of the present invention.

Accordingly, when the service has been created and published, clients 108 may subscribe to the services. FIG. 5 depicts a simplified flowchart 500 of a method for subscribing to a service according to one embodiment of the present invention. In step 502, a request is received from a client 108 to subscribe to a created service. The request may be received through a web portal or by any other methods. Clients 102 may contact and access gateway 104 directly.

In step 504, a specification for rules or criteria for using a service is received from client 108. This specification may indicate criteria that are needed to select the service for a transaction received from client 108. The criteria may be client-specific or may be uniform across many clients 108 (e.g., for all POS devices for an entity). Also, the specification may be in the form of a priority for each service subscribed to by the client 108. For example, a client may specify that, for a transaction, a first service is selected, but, if that service is not working, then a second service should be selected, etc. The criteria may also be more complicated and include more complex rules that factor in the network costs, service costs, etc.

In step 506, rules for routing the requests for the service are generated. These rules may specify criteria that need to be satisfied based on application level content and/or the current state of the network transport environment in order for the service to be selected.

In step 508, these rules may be dynamically loaded into rules database 222. Accordingly, a service may be immediately available to a client 108 that subscribes to the service.

In step 510, flow definitions for the service are generated. Flow definitions may be configured to support the service. In one embodiment, flow definitions for the service may have already existed and may not need to be generated. However, if the specialized business services need to be performed for client 108, new flow definitions may be generated.

In step 512, the flow definitions generated in step 510 may be dynamically loaded by configuration loader 220.

In one embodiment, the rules may be received from a client 102 before a transaction is sent. For example, client 102 may subscribe to a service and provide rules for using the service. In another embodiment, the rules may be sent immediately before or after a transaction is sent. For example, client 102 may specify rules to use in a message sent before or after the transaction. The rules are then dynamically loaded onto gateway 104. This allows a client 102 to dynamically configure gateway 104 at run-time.

Decentralization of Rules for Services

A plurality of gateways 104 may be deployed in a system. Each gateway 104 can provide its own services to clients 102 it is coupled to. Gateway 104 may be positioned at the edge of network 106, at a point of client access, and possibly on the physical premise of a client 102. In one embodiment, gateways 104 only store information for services offered by the gateway 104. Different gateways 104 may have information for a different set of services. Accordingly, the information for providing various services registered by service providers or subscribed to by clients 102 may be distributed across gateways 104 or is decentralized. Because of the decentralization of information, gateways 104 are configured to contact other gateways 104 to either query for information for a service or to provide information for a service.

Figure 6:
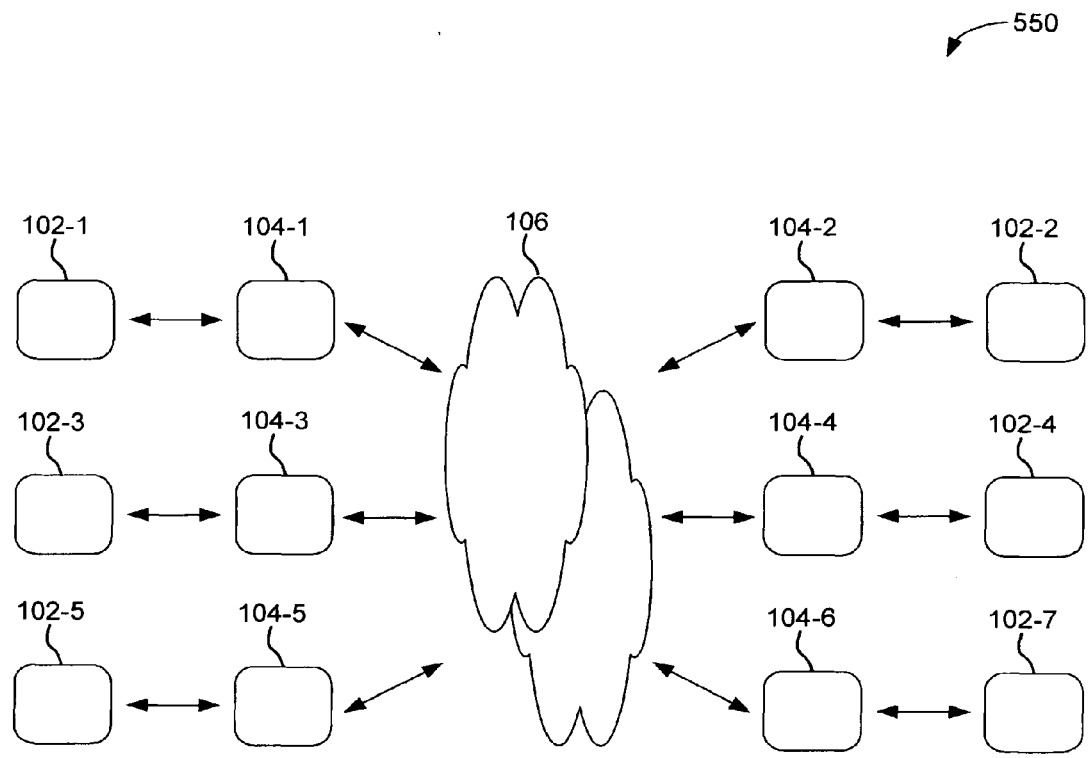
FIG. 6 depicts a decentralized system of a plurality of gateways according to one embodiment of the present invention.

FIG. 6 depicts a system 550 showing the decentralized system of gateways 104 according to one embodiment of the present invention. As shown a plurality of clients 102 and gateways 104 are shown. Gateways 104 are located on the edge of one or more networks 106.

Each gateway 104 may be coupled to one or more clients 102. For discussion purposes, a single client 102 is shown coupled to a gateway 104 but it will be understood that many clients 102 may be coupled to a gateway 104. Also, it will be understood that gateways 104 may be coupled to transaction processors 108 instead of clients 102.

Gateway 104 is configured to process transactions for the clients 102 it is coupled to at the edge of network 106. For example, gateway 104-1 is configured to process transactions for client 102-1 and gateway 104-2 is configured to process transactions for client 104-2. Gateway 104-1 stores information for services offered to client 102-1 and also information regarding preferences for client 102-1. The same is true for other gateways 104 and clients 102.

Gateways 104 maintain contact information for other gateways 104 to facilitate distribution of information for services. For example, when a first gateway 104 needs information for a service not currently offered by the first gateway 104, it can contact a second gateway 104 that offers the service to have information, such as the rules for the service, sent to it. In another embodiment, the first gateway 104 may send a transaction for the service to the second gateway 104 where the second gateway 104 can process the transaction. In this case, the second gateway 104 can switch the transaction to a transaction processor 108, receive a response, and then send the response back to the first gateway 104.

The contact information may also be used to distribute information for services to other gateways 104. For example, a service provider may upload a new service on a first gateway 104. The rules for the service may then be distributed to other gateways 104. For example, gateways that are coupled to clients 102 at the edge are sent the rules if the clients 102 are interested in the service. Clients 102 can also upload their own rules.

Each client may load only the rules for services it desires, reducing the memory and updating needed, and improving the speed of the gateway processing. For example, a hotel client may want a points or rewards service, but not a money transfer service. By only loading desired services, the hotel could get more information on its gateway without impacting performance. For example, the account numbers, or ranges of account numbers, that are in a points program can be stored on the gateway, so the processing to determine if a user qualifies for points can be done locally. A web site client, on the other hand, might be more interested in the Verified by Visa service. Similarly, information and rules particular to Verified by Visa could be stored locally, such as whether a card member subscribed and has a password, allowing prompting for the password without going out over the network to determine if the user is a subscriber. Certain merchants that do a lot of business with certain corporations may be more interested in the Visa business card, and want local listings of purchase card account numbers that are approved for purchases at that particular merchant.

In this way, clients 102 and service providers may interact directly with gateways 104 to load or request services. This may be advantageous for clients 102 because gateways may be tailored to that client's needs. Further, because a gateway 104 may be maintained at a client's site, the gateway 104 may be accessed easily and without delay.

Accordingly, a decentralized set of services is provided by system 550. Instead of having a central processor, the processing is distributed to the edge of the network. This eliminates bottlenecks and provides failover protection. For example, conventionally, if a central processor is used and it goes down, then transaction processing for the whole system may be affected. However, if a gateway 104 goes down, processing for the whole system 550 is not affected and transactions may be rerouted to other gateways 104.

Deployment Scenarios

Figure 7:
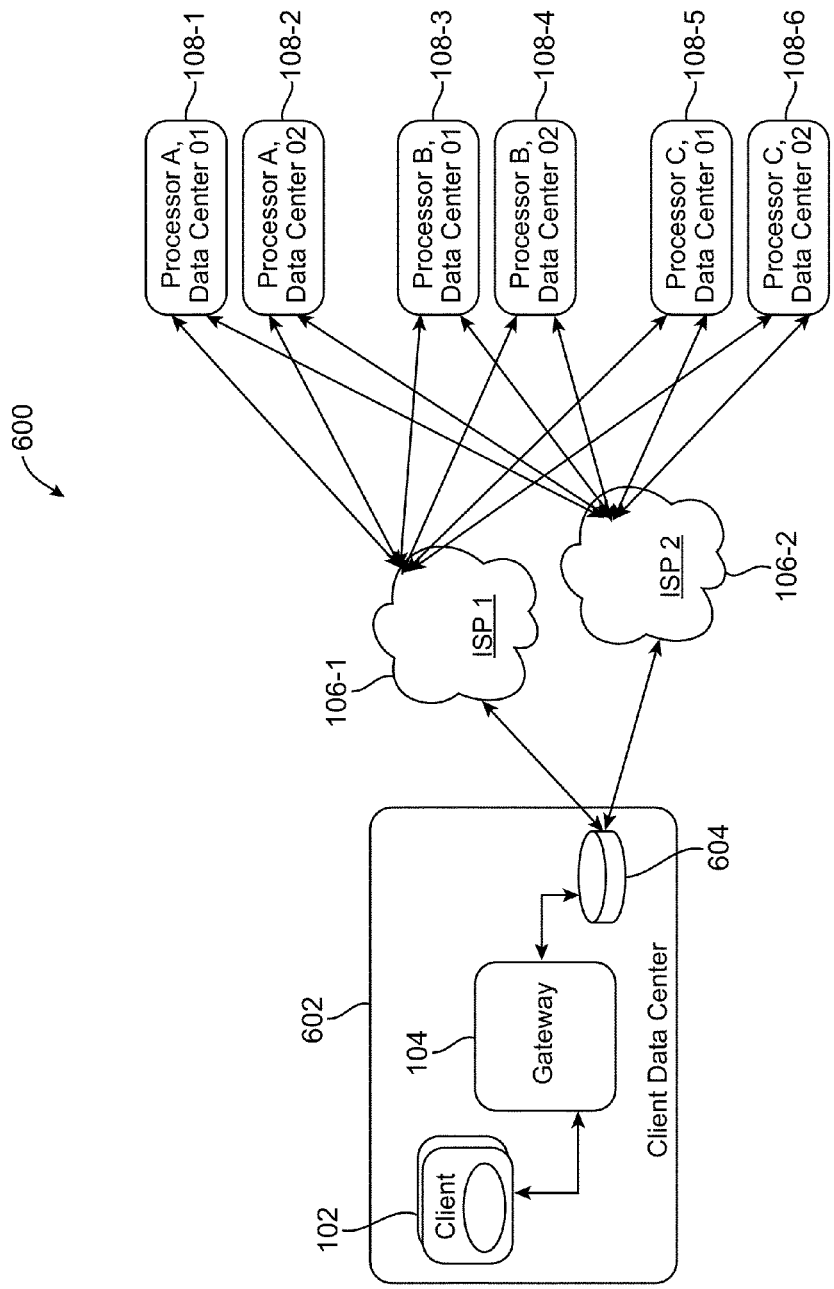
FIG. 7 depicts a system that shows the gateway as a front-end gateway according to one embodiment of the present invention.

Gateway 104 may be deployed in many different scenarios. For example, gateway 104 may be deployed as a front-end gateway on a private network, as an Internet gateway, and/or as a wireless gateway. FIG. 7 depicts a system 600 that shows gateway 104 as a front-end gateway according to one embodiment of the present invention. System 600 connects one or more clients 102 to one or more transaction processors 108 across disparate networks 106. Transaction processors 108 may be any system that can process a transaction from client 102. For example, Visa, MasterCard, etc. may own transaction processors for credit card and debit card transactions, and a member bank (acquirer/issuer) may be a client 102.

A client data center 602 may receive transactions from client 102. The transactions may be credit card authorizations or debit card transactions. The data center may be a central computer connected via a client's private network to multiple POS devices, for example. Gateway 104 processes the transactions and intelligently switches the transactions to a transaction processor data center 108. For example, if the transaction is a Visa transaction, transaction processor data centers A and B may be associated with Visa. If the transaction is a MasterCard transaction, processor data centers C may be selected because they are associated with MasterCard.

Gateway 104 determines an appropriate transaction processor 108 and network 106 in which to route the transaction. The transaction is then sent to a router 604 which can then route the transaction. In one embodiment, router 604 may route packets to the selected transaction processor 108 through a network 106.

Figure 8:
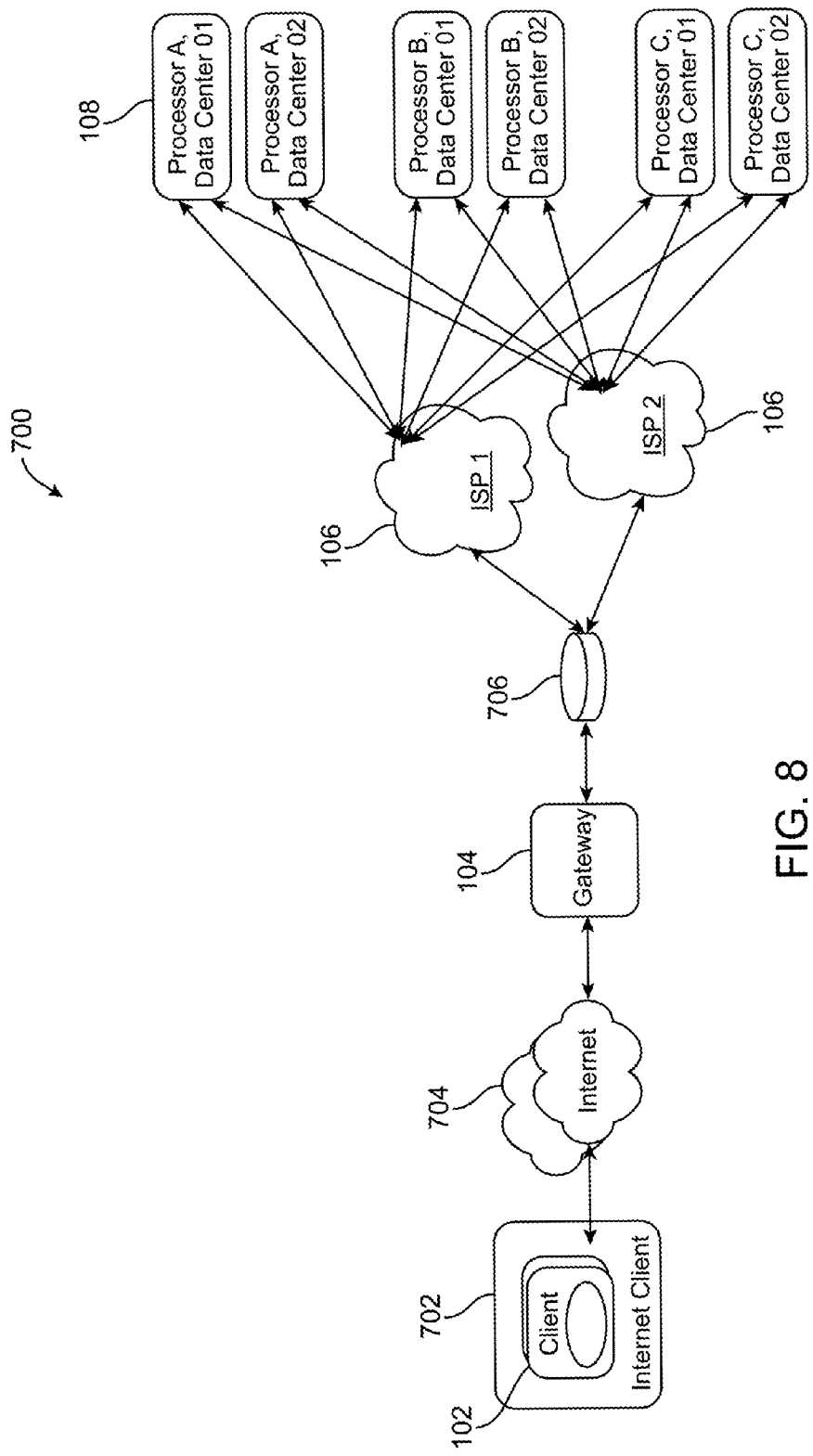
FIG. 8 depicts a system where the gateway is an Internet gateway according to one embodiment of the present invention.

FIG. 8 depicts a system 700 where gateway 104 is an Internet gateway according to one embodiment of the present invention. An Internet client 702 includes a client 102. Client 102 may send transactions to gateway 104 through the Internet 704. Gateway 104 may be configured for particular services needed for on-line shopping, such as normal credit card authorization, password authentication (Verified by Visa), rewards or points processing, etc.

Gateway 104 provides connectivity to different transaction processors 108 for client 102. Gateway 104 may accept HTTP(s) and other XML-based requests. Based on application level content and the current state of a transport environment, a service and transaction processor 108 may be selected. Because the transaction may have been sent in HTTP or any other XML-based request, gateway 104 may translate the message to a format expected by transaction processor 108 before switching the transaction. For example, transaction processor 108 may require that a message be processed in an ISO 8583 format. Typically, when a POS device processes a transaction, the transaction may be sent in the ISO 8583 format. However, when a transaction is processed by an Internet gateway, an Internet client 702 may not be configured to send an ISO 8583 message. Thus, gateway 104 is configured to format the message into the ISO 8583 format required by transaction processor 108.

In one example, gateway 104 may process Internet transactions from an Internet client 702. Internet client 702 sends an HTTP(s) request to gateway 104. Gateway 104 translates the HTTP(s) request into a canonical internal message format. Any business services may then be performed on the transaction. In one example, application level data may be changed in order to conform to a format required by transaction processor 108. For example, an XML transaction may be converted into an ISO 8583 format. Gateway 104 then intelligently switches the transaction to a transaction processor 108.

Transaction processor 108 processes the transaction and sends a response back to gateway 104. This response may be in a transaction processor-specific format. Gateway 104 then builds an HTTP(s) response and sends it to Internet client 702. Accordingly, a transaction through the Internet can be processed using gateway 104.

Figure 9:
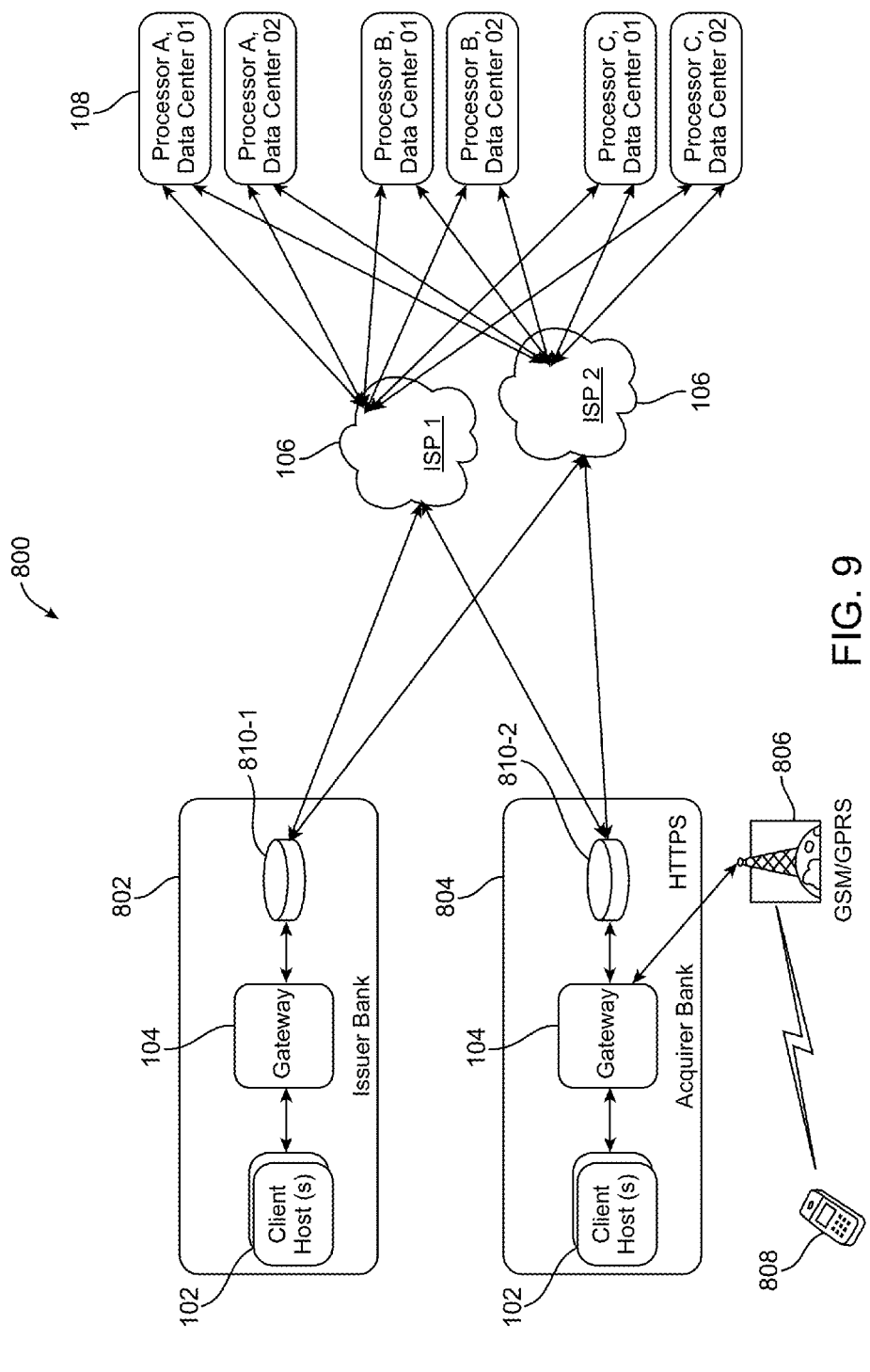
FIG. 9 depicts a system where the gateway is used as a wireless gateway according to one embodiment of the present invention.

FIG. 9 depicts a system 800 where gateway 104 is used as a wireless gateway according to one embodiment of the present invention. The gateway may receive wireless messages from a user's mobile phone, PDA, pager, etc. Gateway 104 may be configured to support different wireless formats, such as wireless application protocol (WAP), mobile information device protocol (MIDP), JQME, etc. A MIDlet sends XML format requests over networks such as the global system for mobile communication (GSM) or general packet radio services (GPRS). Gateway 104 may convert inbound request payloads into a canonical internal message format. The internal message format (IMF) may then be processed by business services. The outbound message stream builder 212 converts the IMF to a response payload for sending to a transaction processor 108. Accordingly, wireless transactions may be processed by gateway 104.

A wireless transaction will now be described. In one embodiment, a wireless client 808 initiates a wireless payment transaction by sending an XML request over HTTP(s)/GSM/GPRS. Gateway 104 receives the XML request and converts it into a canonical internal message format before processing the request. Application level content in the transaction is used in addition to a current state of the transport environment to switch a transaction to a transaction processor 108. Depending on the transaction processor 108 selected, flow handler 210 may perform business services on the transaction. The transaction is then sent to a transaction processor 108.

Transaction processor 108 determines a client bank (or issuer) 802 and routes a message to the issuer 802. Issuer 802 processes the request and sends a response back to transaction processor 108. Transaction processor 108 then sends a response (in a transaction processor-specific format) back to acquirer 804. Gateway 104 receives the response, translates it into an XML format, and sends it to wireless client 808. Accordingly, gateway 104 is configured to route wireless transaction payments.

Figure 10:
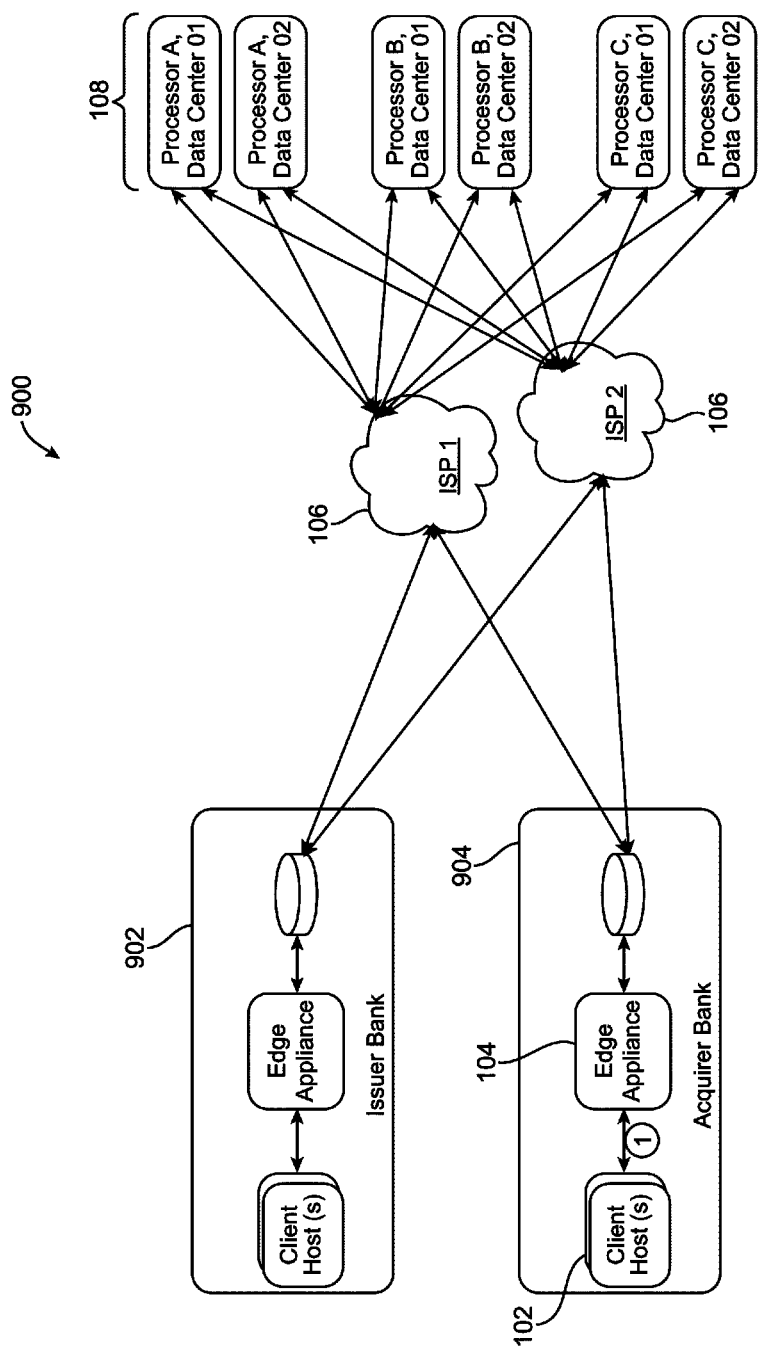
FIG. 10 depicts a system for processing ISO 8583 transactions according to one embodiment of the present invention.

FIG. 10 depicts a system 900 for processing ISO 8583 transactions according to one embodiment of the present invention. As shown, an issuer bank 902 and an acquirer bank 904 participate in the transaction. A client computer 102 at an acquirer bank 904 sends an ISO 8583 request to gateway 104. Gateway 104 uses application level content and the current state of the transport environment in order to select a transaction processor 108 to handle the request. The message is then sent to the selected transaction processor 108 after any business services are performed on the request.

Transaction processor 108 processes the transaction and switches it to the appropriate issuer 902 for authorization. The issuer sends an ISO 8583 back to transaction processor 108. Transaction processor 108 then sends a response to gateway 104, which then is sent to client 102 of acquirer bank 102.

In one example, a transaction processor 108 may not be available. In this case, for example, Processor A, data center 01 may not be available. This may be the preferred processor for a client 102 for the service. Gateway 104 then sends the transaction to a second processor, Processor A, data center 02. Gateway 104 may keep checking for the availability of the primary data center and, once it becomes available, may start routing messages to the primary data center. The re-routing of transactions is done in a manner that is transparent to client 102. Accordingly, down time for any transaction processors 108 is avoided using the intelligent switching of gateway 104.

In another embodiment, the data centers for Processor A may be down and other data centers for other processors, such as Processors B and C, may need to be used. Processors B and C may process transactions in a different format than that of Processor A. In this case, gateway 104 may convert the format of the transaction to a format that corresponds to a format for processor B or processor C. The formatted transaction is then sent to processor B or processor C. Accordingly, different processors can be used in a way that is transparent to clients 102. Even if processors use different formats, gateway 104 is configured to still route the transaction in that format.

Parse/Build of Messages

Overview of Parse Build Engine

Figure 11:
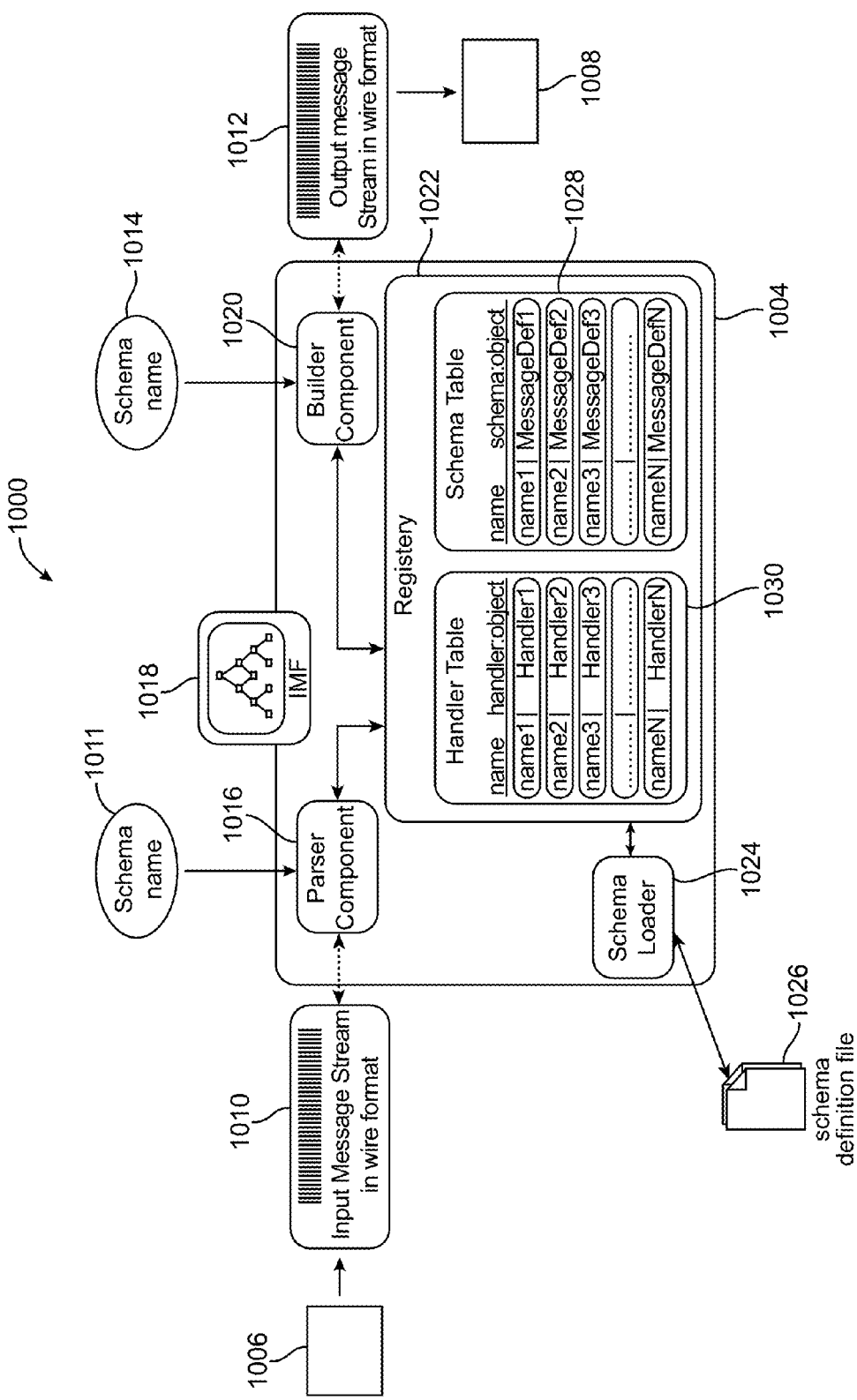
FIG. 11 depicts a system for parsing messages according to one embodiment of the present invention.

FIG. 11 depicts a system 1000 for parsing messages according to one embodiment of the present invention. System 1000 is configured to parse multi-format message streams, such as ISO 8583 messages into a canonical message format referred to as an internal message format (IMF) and build multi-format message streams, such as ISO 8583 message streams, from the IMF. Although financial message streams are described, it will be understood that any multi-format message streams may be parsed and built using system 1000.

Parse/build engine 1004 corresponds to inbound message stream parser 204 and outbound message stream builder 212 of FIG. 2 Although all the components as shown in FIG. 2 are not shown in FIG. 11, it will be understood that those components may also be included in system 1000. Additionally, parse/build engine 1004 may be included in gateway 104, but may also be included in other components. For example, parse/build engine 1004 may be compatible with any software applications that processes data in a data format different from other heterogeneous systems.

Parse/build engine 1004 is configured to receive an input message stream 1010 from a system 1006 and parse the message into an internal message format. The internal message format (IMF) may then be processed by other components, such as a business services application shown in gateway 104. After components in gateway 104 process the message in the IMF, parse/build engine 1004 builds an output message stream 1012 from the processed IMF. The output message stream 1012 may then be sent to a system 1008, or returned to originating system 1006.

Systems 1006 and 1008 may be any system that is configured to send messages 1010 and/or receive messages 1012 from parse/build engine 1004 (or gateway 104). In one embodiment, systems 1006 and 1008 may be point of sale devices, smart card devices, transaction processors 108, any system configured to process transactions, such as an acquirer, issuer, a service provider, a transaction authenticator, etc. Systems 1006 and 1008 may send/receive messages in many different formats such as ISO 8583 messages, extensible mark-up language (XML), HTML, etc. The input message stream may also be in any of multiple encoding schemes, such as ASCII, EBCDIC, BCD, etc., and have different data types, such as numeric, string, byte-array etc.

The parse/build engine of FIG. 11 uses a schema table 1028. Each schema is a data structure that provides metadata, including a grammar structure for the received format as well as pointers to handlers in handler table 1030. The handlers correspond to particular fields in the message and convert the different fields of the message into the internal message format using the grammar structure. The handlers are code that is individually compiled. Thus, rather than compiling the overall system, the handlers are separately compiled, giving the speed of compiled software while retaining a modular system that can be easily upgraded without disturbing other elements of the engine.

Parse/build engine 1004 loads the identified schema and invokes the functionality of handlers associated with the schema. The handlers then parse the fields of a message into an IMF object The schemas and any associated handlers not already loaded, may be loaded from schema definition file 1026 into schema table 1028 and handler table 1030 using the schema loader 1024. Schema table 1026 includes various schemas, labeled schema name 1, name 2, . . . , name N. For each message format that may be parsed and built by parse/build engine 1004, a corresponding schema may be provided. Each schema name is associated with a schema object that defines the "grammar," the composition of a message stream in the external format. The composition may include a field sequence, field type, length, character encoding, and other fields that are optional or required. The new schema and compiled handlers may be loaded and used by parse/build engine 1004 without recompiling parse/build engine 1004.

Parse/Build Flow

An example flow will now be described. As shown in FIG. 11, when a message is received, a business services program calls the parse/build engine 1004. The message 1010 (a message stream in wire format) is sent to the parse/build engine, where it is first received by parser component 1016. The business services application also provides the schema name 1011 to parser component 1016. The parser component creates an internal message format (IMF) object in which to store the values from the message fields once they are translated into the IMF. In one embodiment, parser component 1016 recognizes the origin of message 1010 and determines which schema is needed for messages 1010 sent from the origin. In another embodiment, information in message 1010 may be parsed to determine the data format and thus a corresponding schema that should be used. Further, message 1010 may indicate which schema corresponds to the data format.

In one example, the parser component 1016 first looks up a root schema corresponding to the format of message detected, such as an ISO 8583 financial message. Such an ISO message may have a bitmap at the beginning which identifies which fields are present. The root schema would point to a handler, which is called and parses a type field to determine what type of message has been received (e.g., authorization message, reconciliation message, etc.). The parser component then looks up the schema for the message type identified, which in turn provides the particular grammar and points to handlers for that message type. Schema and handlers are looked up and called only for the fields actually present in the message. As new fields are identified or pointed to, new schema can be looked up and the corresponding handlers can be called. A particular field could be a composite field with one or more conditions, and the translating or parsing of the conditions can point to additional schema and associated handlers needed, depending on the outcome of the condition.

The IMF object 1018 (described in more detail below) is populated by the called handlers. The only fields populated are the fields corresponding to the fields included in the incoming message.

IMF object 1018 may then be processed by the business software application of gateway 104. After being processed, IMF object 1018 is sent to build component 1020 along with a schema name for the outbound message stream. Because processing of the processed IMF object 1018 may be performed in a different data format, builder component 1020 is configured to build an output message stream 1012 from the processed IMF object 1018. The process described above is repeated in reverse, with builder component 1020 looking up a root schema, calling the handler pointed to in order to build the type information in a process that can be reiterated many times. The called handlers build values found in IMF object 1018 into the fields that should be included in output message stream 1012. Output message stream 1012 may then be sent to system 1008, which can process the output message stream 1012.

Figure 12:
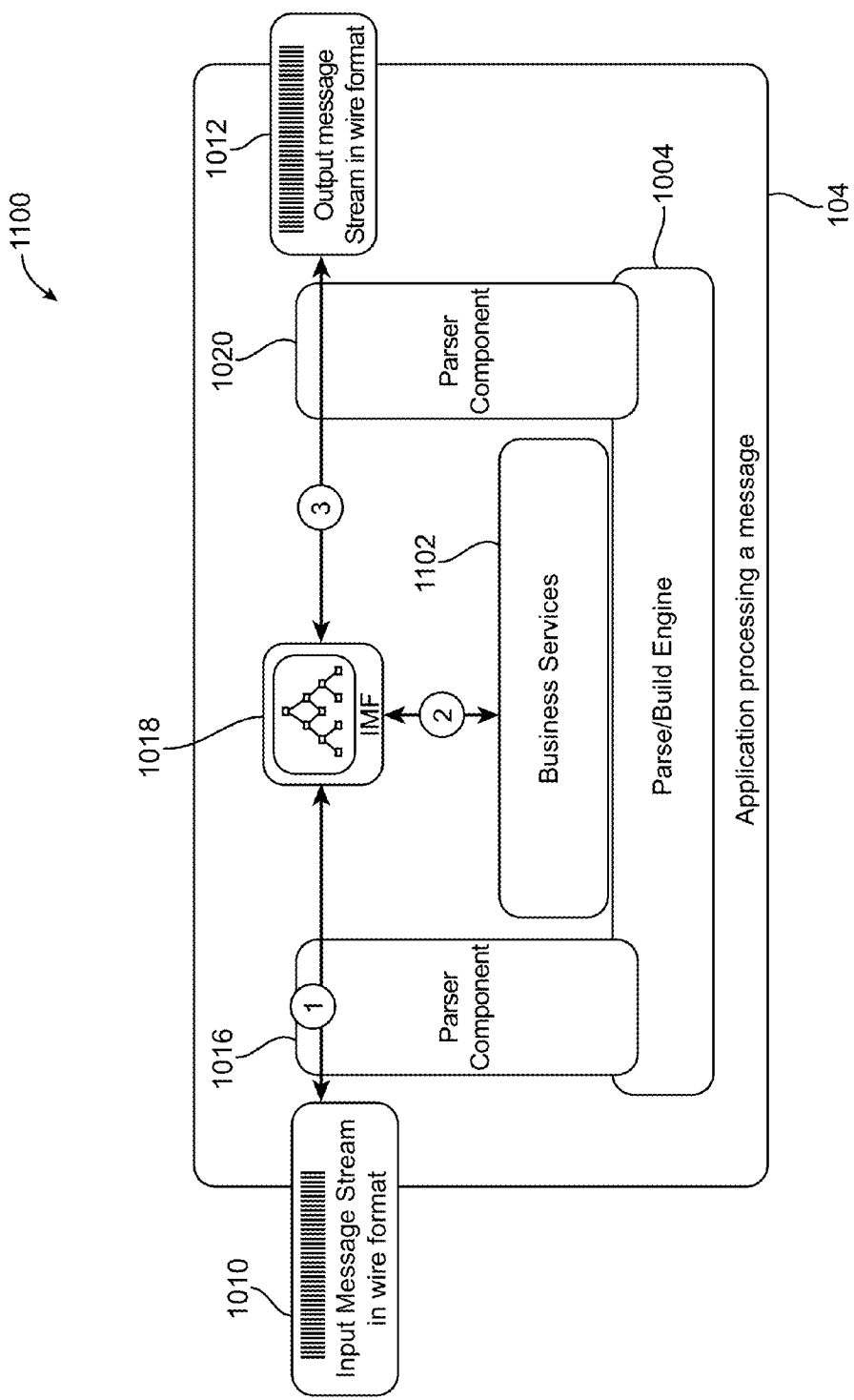
FIG. 12 discloses an embodiment of a gateway according to embodiments of the present invention.

FIG. 12 illustrates a business services application 1102 that uses the IMF object 1018 to perform any services provided by gateway 104. Business services application 1102 operates on IMF object 1018. The operations could include application layer routing, such as determining an issuer bank or processing center to send the message to. Additionally, services may be performed on a message, such as application level formatting of the message stream, logging, time-stamping, creating new fields needed for a reply or further processing, etc. The business services application could do pre-processing for an issuer or financial network, or it could perform local processing that has been offloaded. For example, authorization messages for purchases less than $50 may be approved, and a reply message sent without needing to forward the message to a financial institution for approval. Business services application 1102 is configured to process data in internal message format and not the external formats. Accordingly, business services application 1102 is insulated from any external formats that are used by other systems by parsing the message into the IMF.

IMF Structure

FIG. 13A depicts a structure for the IMF 1018 according to one embodiment of the present invention. As shown, N fields are provided in IMF 1018. The fields may be an array of fields where each field can also include any number of child fields, which in turn can include grandchild fields, etc. in a hierarchical structure. For example, Field 1 includes child Fields 1.1, 1.2, . . . 1.N. Fields 1.2, . . . 1.N may also include any number of child fields (not shown). When a message if received, only the fields actually used are populated with data.

Figures 14A, 14B:
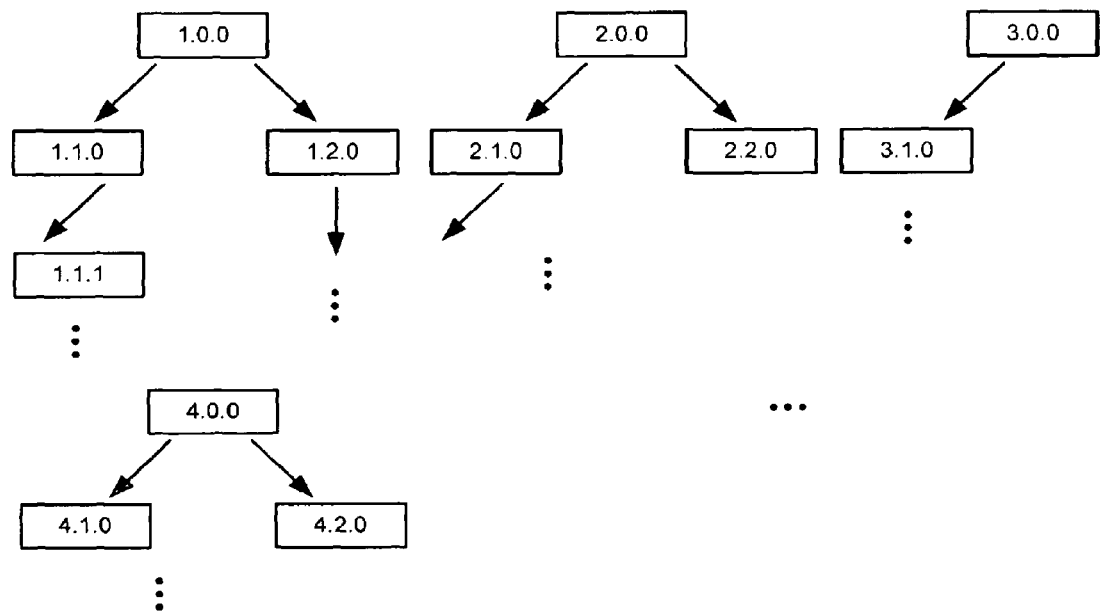
FIGS. 14A, 14B, and 14C depict a possible message, a hierarchical format with object ID codes, and an IMF object for the message according to one embodiment of the present invention.

FIG. 14B shows the hierarchical format with object ID codes, indices to the field definitions for the fields shown in FIG. 13A. The OID allows the indexing for various fields in an IMF object 1018. Field definitions are accessed for fields in IMF object 1018 using the OID. In one embodiment, the OID is an eight-byte number that is represented by the dotted decimal representation shown. The OID for the first field is encoded as 1.0.0. Any subfields are encoded as 1.1.0, 1.2.0, and so on. The second field is encoded as 2.0.0, with any subfields encoded as 2.1.0, 2.2.0, and so on.

Schema Structure

FIG. 13B shows an example schema. The address of the schema is the first line, the message definition (MessageDef). The schema includes grammar and pointers to handlers for each of the fields in the message. In the example shown, the first field of the message is identified by a Field Definition Object (FieldDef) 1202 with index 1.0.0. This is also referred to as an OID attribute 1202. Following the index for this field is the identification of the handler 1204 to be called (HDR). The rest of the elements on that line are the definitions of the grammar for that particular field. These field definitions describe the properties of the field, such as field sequence, field type, length, character encoding, the names of the hander needed, etc. The field definitions may be used to parse/build fields encoded in different encodings like ASCII, EBCDIC, BCD etc., and different data types like numeric, string, byte-array etc. Thus, multi-format message streams may be processed using the message definition. In one embodiment, the schema is metadata in the form of an XML schema.

The field definitions may include a number of attributes. It will be recognized that the attributes depicted in FIG. 13B are not exhaustive and a person skilled in the art may appreciate that other attributes may be used.

A handler attribute 1204 is the name of the field. A required/optional attribute 1206 indicates whether the field is required or optional in a message. A first data format attribute 1208 is the data format for the value of the field as found in the external format (also referred to as the wire-format). A second data format attribute 1210 is the internal format in which the field is stored in the IMF and processed by the business services.

A custom/not custom attribute 1212 indicates whether the field uses a custom handler or a generic handler to the parsing and building of the field.

A seventh attribute 1214 indicates the handler name that is needed to process the value in the field of the message. The handler takes the value in the identified field in the received message and either parses it into the IMF (for a parser schema) or builds the value from the IMF to an external format (for a builder schema).

An eighth attribute 1216 indicates the number of sub-fields within the field.

Example Message Fields Used in IMF (Internal Message Format)

Figure 14C:
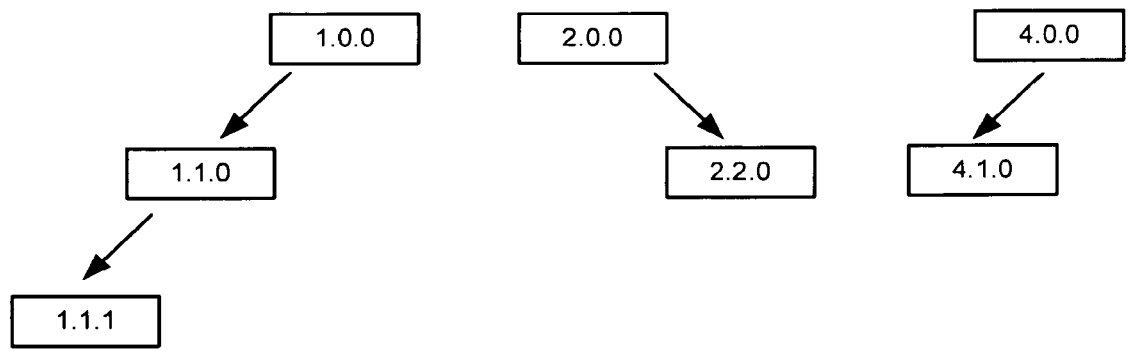

FIG. 14A depicts an example of the fields used for a particular message object 1010 which includes a number of object IDs (OIDs) for different fields, OIDs 1.0.0, 1.1.0, 1.1.1, 2.0.0, 2.2.0, 4.0.0, and 4.1.0. These are the fields pointed to by the schema of FIG. 13B. Thus, for this example message, only the fields identified in FIG. 14C would be populated in the message object, which is shown in FIG. 13A. FIG. 14B shows a portion of the total hierarchical object IDs for the complete set of fields in the internal message format. As can be seen, message 1010 only includes the portion of these fields that it needs. For example, object IDs 1.2.0, 3.0.0 and 4.2.0 are not used. Note that these fields may have any number of child fields.

The object IDs provide a fast indexing system into the hierarchical internal message format of the message object shown in FIG. 13A. This indexing system uses the encoded object IDs (1.0.0, etc.), which, for each field used in the received format, index into (point to) the corresponding field of the internal message format. The indices can point directly to fields that are several layers down in a hierarchical structure.

When components of gateway 104 process IMF object 1018, processing of the unnecessary fields is not performed. Thus, processing speed is increased.

Required fields may also be added to IMF object 1018. Some fields may be required by business services module 1102 or transaction processors 108. If it is determined that a field that is necessary to be used is not included in a received message 1010, the field may be populated by the business services module for inclusion in the message to be built for retransmission. Thus, the "required" fields in the schema of FIG. 13B may be added to an IMF object 1018 if not included in message 1010.

Initializing Parse/Build Engine

Figure 15:
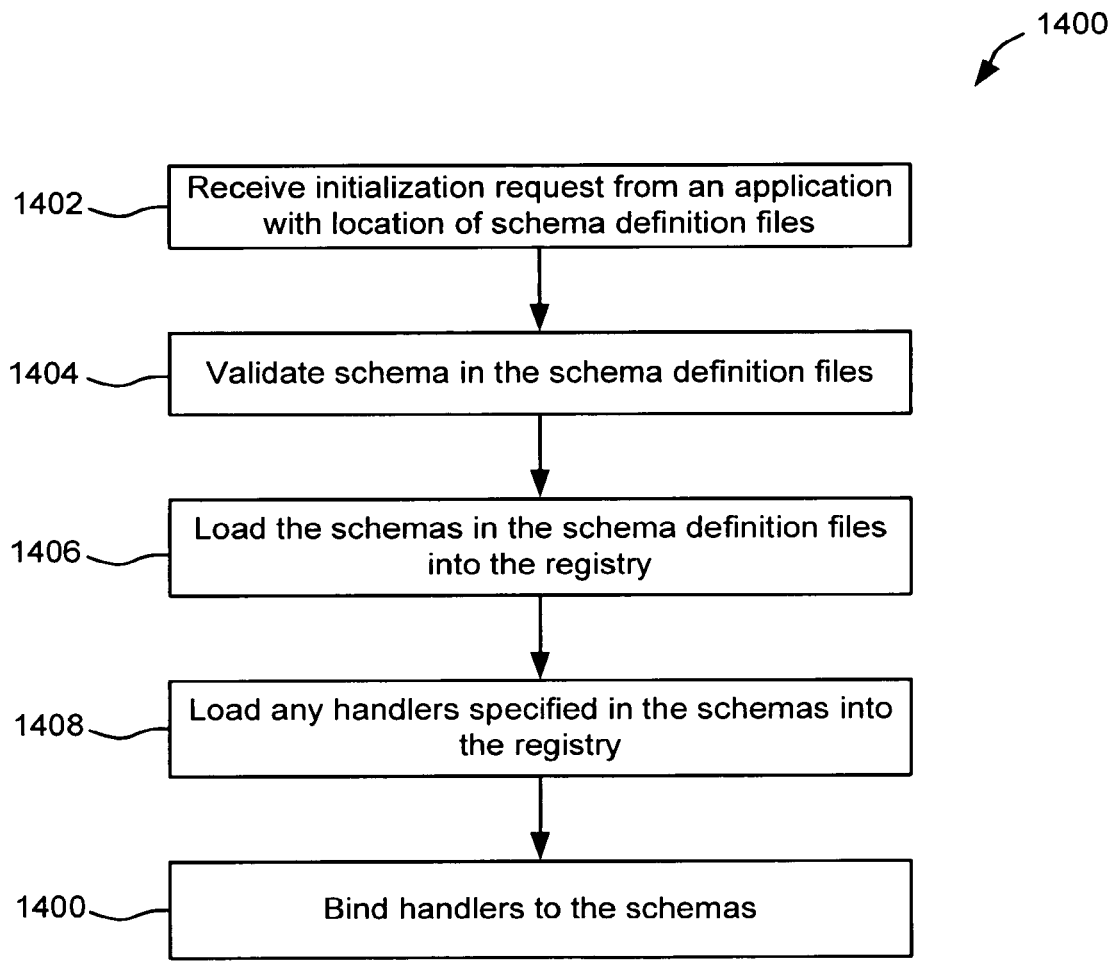
FIG. 15 depicts a simplified flowchart of a method for initializing the parse/build engine to process a message stream according to one embodiment of the present invention.

FIG. 15 depicts a simplified flowchart 1400 of a method for initializing parse/build engine 1004 upon the start-up of the business services application. In step 1402, an initialization request is received from the application. The request includes the location of one or more schema definition files 1026.

In step 1404, the schemas found in schema definition files 1026 are validated. The schemas are validated by a number of procedures, such as verifying that the correct type of data is referred to, that the handlers identified by the schema actually exist, etc.

In step 1406, the schemas in schema definition files 1026 are loaded into registry 1022 from disk or other storage repository into DRAM memory using schema loader 1024.

In step 1408, any handlers specified in the schema are loaded into registry 1022. For example, handlers specified by the field definitions in the message definition object are loaded into handler table 1030. In one embodiment, handlers are stored as objects keyed by the handler name.

In step 1410, the handlers are bound to the respective message definition objects. For example, all handlers that are specified by field definitions in a message definition object are bound to that message definition object.

Parse/build engine 1004 has now been initialized for the schema. In one embodiment, compiling of parse/build engine 1004 is not necessary. This is because of the use of compiled handlers that are used to parse/build field values.

During run-time, schemas may be dynamically updated and added to parse/build engine 1004. The schemas may be updated by changing message definition objects or may be added by adding new message definition objects. If new handlers are needed, they may also be dynamically added to parse/build engine 1004 as compiled objects.

The schemas may be added without recompiling parse/build engine 1004 and without bringing it down. Thus, parse/build engine 1004 may continue to parse/build messages even as schemas are updated.

Adding or Updating Schema

Figure 16:
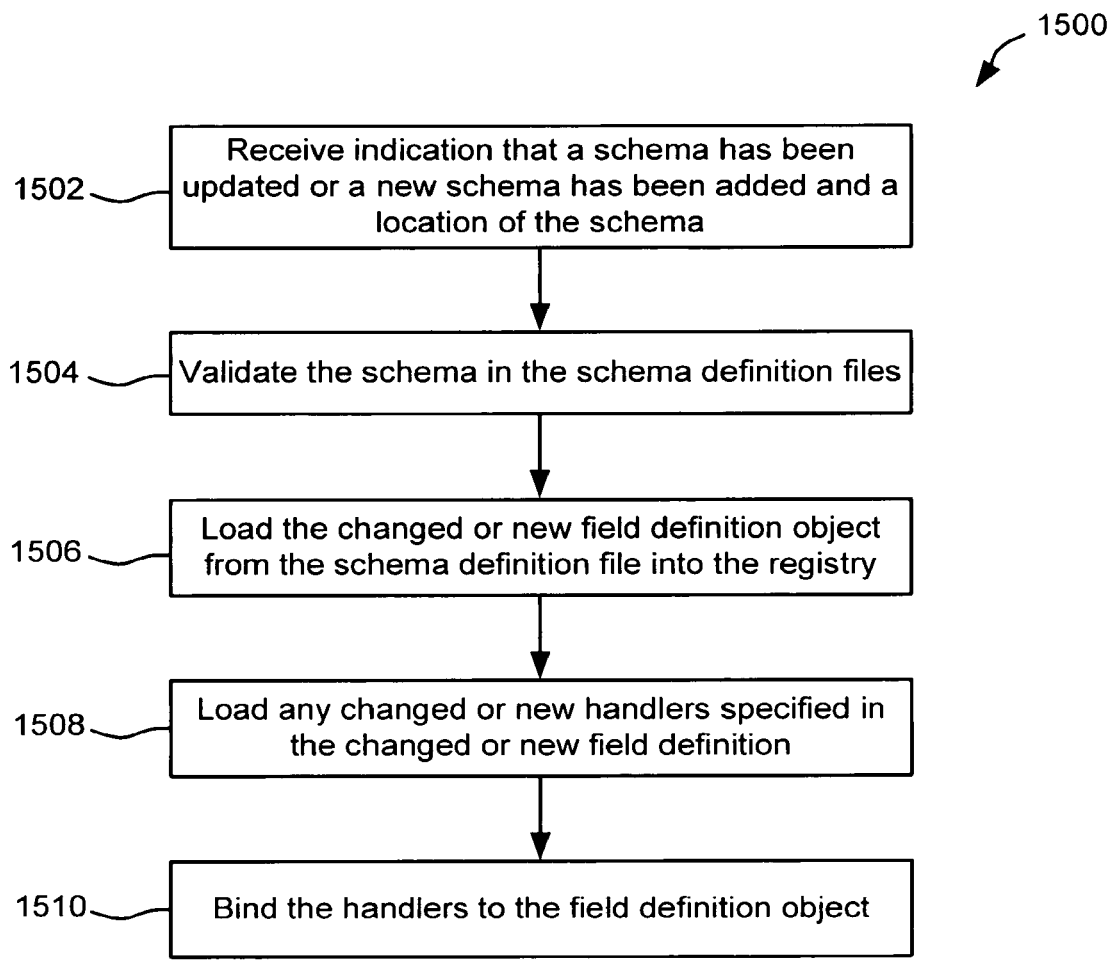
FIG. 16 depicts a simplified flowchart of a method for dynamically adding or updating a schema in the parse/build engine according to one embodiment of the present invention.

FIG. 16 depicts a simplified flowchart 1500 of a method for dynamically adding or updating a schema in parse/build engine 1004 according to one embodiment of the present invention. In step 1502, a request to dynamically add or update a schema is received from an application. The request includes the location of one or more schema definition files 1026 that include the new or updated schema.

In step 1504, the schemas found in schema definition files 1026 are validated.

In step 1506, the schemas in schema definition files 1026 are loaded into registry 1022. If an updated schema is provided with a set of new field definitions or changed field definitions, only the new or changed field definitions may be loaded into registry 1022. While adding or updating the schema, the appropriate data structures are write-locked to ensure that in-flight messages being processed are not corrupted as a result of schema change. The in-flight messages continue to use the previous version of the schema while the Schema Loader 1024 loads the updated version of the schema.

In step 1508, any handlers specified in the message definition object are loaded into registry 1022. Parse/build engine 1004 may check to determine if any handlers are already present in registry 1022 and may not reload those handlers into registry 1022. However, if any handlers were changed, the changed handlers are loaded.

In step 1510, the handlers are bound to the respective message definition objects. In one embodiment, only the new or changed handlers are bound to a message definition object that has been updated. Parse/build engine 1004 has now been dynamically updated.

Flowchart of Parse Process

Figure 17:
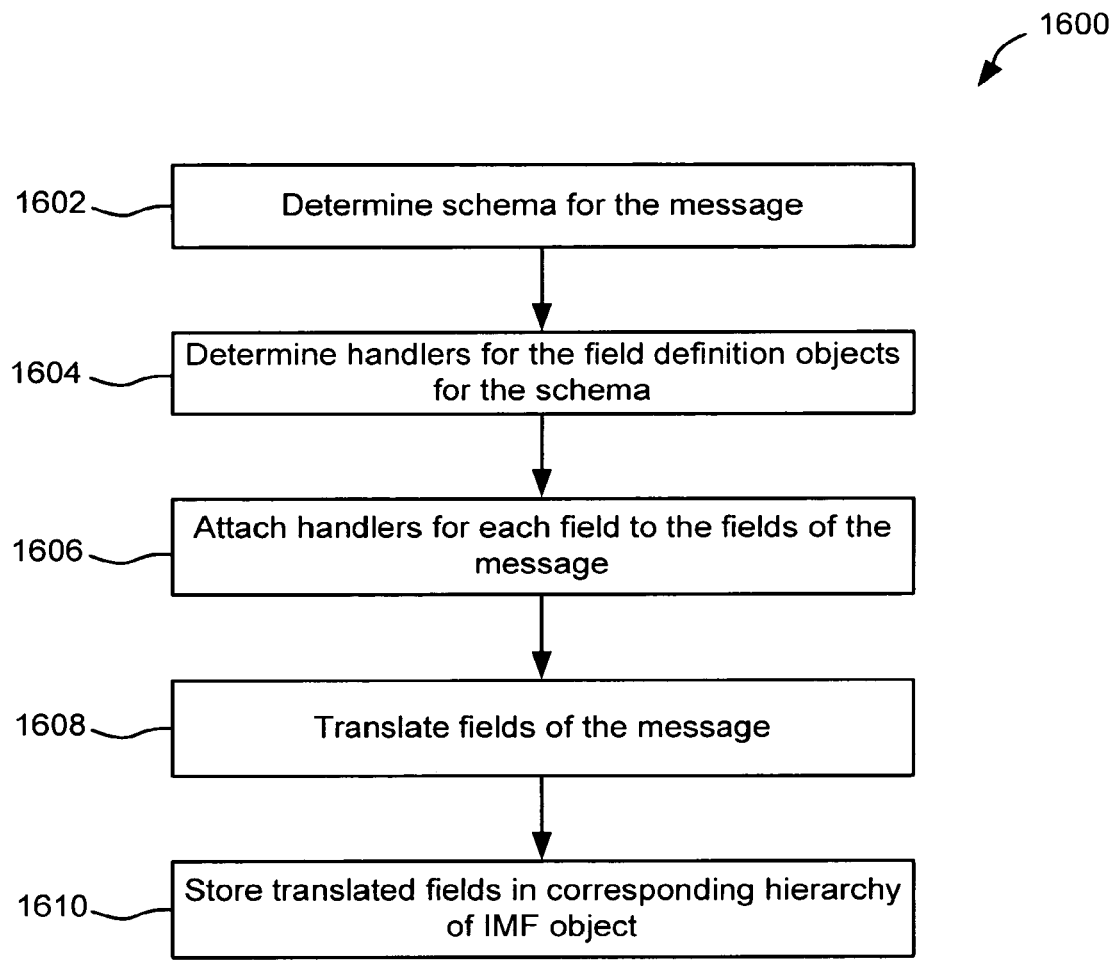
FIG. 17 depicts a simplified flowchart of a method for parsing an input message according to one embodiment of the present invention.

FIG. 17 depicts a simplified flowchart 1600 of a method for parsing an input message stream 1010 according to one embodiment of the present invention. In step 1602, a schema for the message is determined. The schema corresponds to a data format that the input message stream 1010 is composed in.

In step 1604, any handlers for the message definition object are determined from the pointers in the schema.

In step 1606, the handlers for each field are attached to the field.

In step 1608, the handler translates the fields of the message. A handler for each field is invoked. The handlers use the field definitions in the schema to translate values of the fields into the IMF. The OID for the field points to both the field definitions in the schema for that field and also points to the corresponding field in the IMF object 1018.

In one embodiment, parser component 1016 maintains an offset for the fields read in message 1010. For example, the number of bytes read is stored as an offset. The parser component decrements this offset as each handler is called. When the handlers reach the end of message 1010 (e.g., when the offset equals a certain length), or the last field definition in the message definition object, the parser component knows the translation is complete.

In step 1610, the translated fields are stored in the corresponding hierarchy of IMF object 1018. An OID for the field may be used to store the translated values into corresponding positions in a hierarchy in IMF object 1018.

If the translation above fails at any point, an error may be returned to gateway 104. The parsing may continue and an IMF object 1018 may be returned. Error flags, however, may be noted in IMF object 1018.

Flowchart of Build Process

Figure 18:
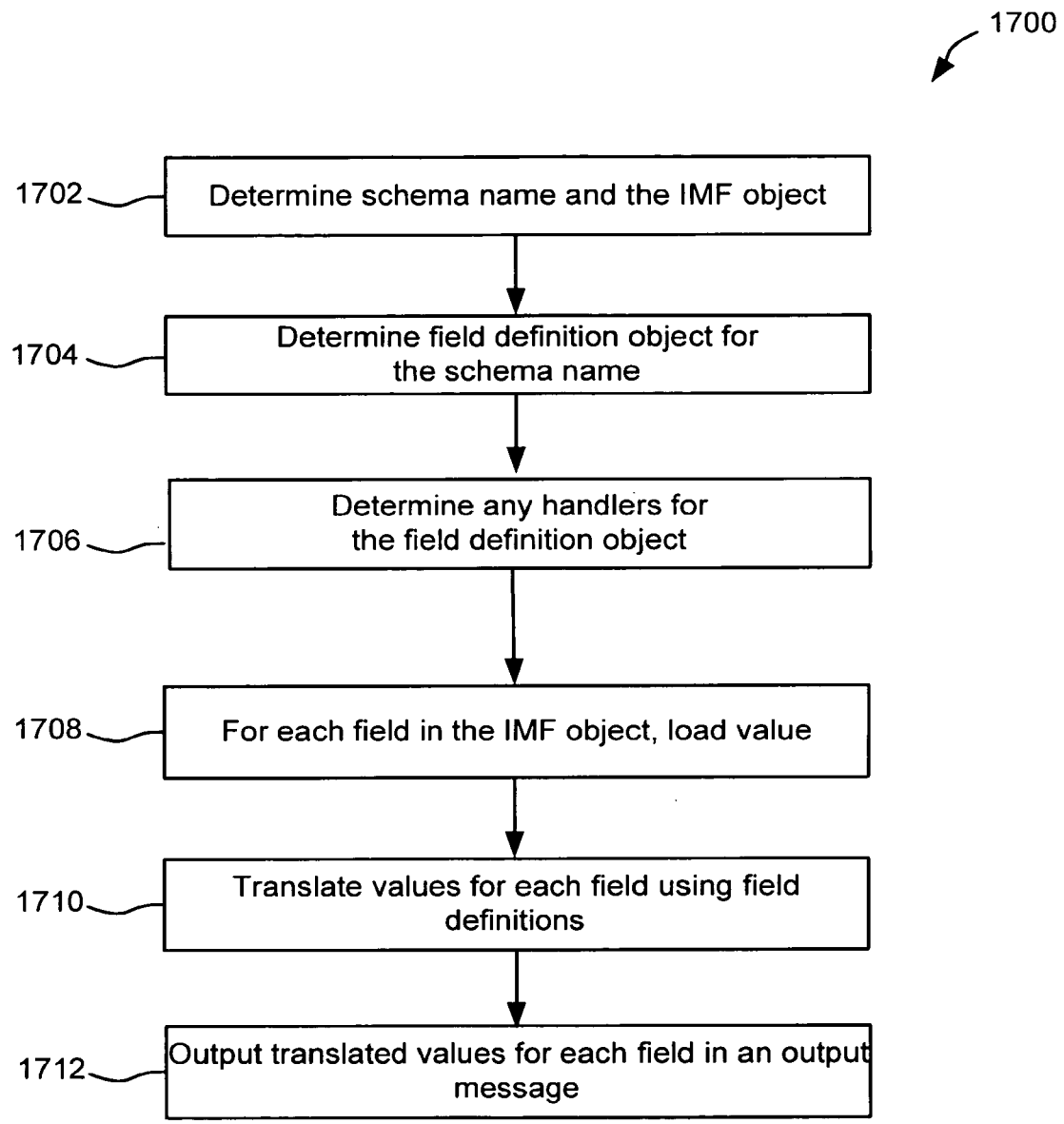
FIG. 18 depicts a simplified flowchart of a method for building an output message from an IMF object according to one embodiment of the present invention.

The build process will now be described with respect to FIG. 18. FIG. 18 depicts a simplified flowchart 1700 of a method for building an output message stream 1012 from an IMF object 1018 according to one embodiment of the present invention. In step 1702, a schema name and IMF object 1018 are determined. In one embodiment, IMF object 1018 is first determined. The schema name may be determined based on information in IMF object 1018. For example, the schema name may be stored in information in IMF object 1018. Also, the schema name may be determined by the channel or destination system in which information in the IMF object 1018 will be sent to.

In step 1704, a message definition object is used to address the schema in registry 1022. In step 1706, any handlers needed for the schema are also determined.

In step 1708, for each field found in IMF object 1018, the value from a corresponding field in the hierarchy in the IMF object 1018 is loaded. OIDs for the field are used to access the field definitions.

In step 1710, the value is translated from the field in IMF object 1018 according to the attributes of the field definition for the field. Accordingly, a value found in the IMF format is translated into a format compatible with another system.

In step 1712, the built values are composed in corresponding fields of a generated output message stream 1012.

If a value for a field in an IMF object 1018 is not found for a field required for the external form a, the value for that field in the external message may be set to null or the message generated may simply not have this field in the message. Further, if it is determined that IMF object 1018 should have had this field, then an error may be returned indicating that a field was not found in IMF object 1018.

Alternatives

The present invention can be implemented in the form of control logic in software or hardware or a combination of both. The control logic may be stored in an information storage medium as a plurality of instructions adapted to direct an information-processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method, performed by a processor, for building an output message from a common internal message format object, the method comprising:

determining a schema for the output message, the output message comprising a plurality of fields;

retrieving a plurality of handlers based on said schema, each handler being code for building at least one field of said plurality of fields of the output message from said common internal message format object, each of said handlers being separately compiled; and translating said common internal message format object into said output message using said handlers.

2. The method of claim 1 wherein said output message comprises a hierarchical structure of possible fields, wherein said translating is only done for fields in said output message corresponding to fields that are populated in said common internal message format object.

3. The method of claim 1, wherein each message field included in said schema is identified by an object ID, said object ID being an index pointing to a particular location in said common internal message format object.

4. The method of claim 3, wherein said object ID is an eight-byte number.

5. The method of claim 1, further comprising:
dynamically loading one of said handlers without recompiling the other handlers.

6. The method of claim 1, further comprising:
determining a subsequent schema from said translating; and
iterating the process of claim 15 for said subsequent schema on said output message.

7. The method of claim 1 wherein the schema is determined based on a field in the common internal message format object.

8. The method of claim 1, further comprising:
processing said common internal message format object by a business services application.

9. The method of claim 1 further comprising:
determining any fields in said output message that are not in said common internal message format object; and
removing said fields that are not in said common internal message format object from said output message.

10. The method of claim 1 further comprising:
determining any fields in said output message that are not in said common internal message format object; and
setting said fields that are not in said common internal message format object to null in said output message.

11. The method of claim 1, wherein said output message relates to an electronic payment transaction.

12. The method of claim 11, wherein the output message is an ISO 8583 message, and wherein the method further comprises transmitting the output message to an issuer that participates in the electronic payment transaction.

13. The method of claim 11, wherein the output message is an XML message, and wherein the method further comprises transmitting the output message wirelessly to a client that participates in the electronic payment transaction.

14. The method of claim 11 further comprising:
identifying a first electronic payment transaction processor;
identifying a second electronic payment transaction processor;
determining that the first electronic payment transaction processor is unavailable; and
transmitting the output message to the second electronic payment transaction processor.

15. The method of claim 14, wherein the scheme determined for the output message corresponds to a message format compatible with the second electronic payment transaction processor.

16. An engine configured to build messages, the engine having executable instructions stored in a non-transitory computer readable medium and further comprising:
a plurality of handlers stored in a handler table, each handler being code for building at least one field of an output message using grammar for said at least one field, each of said handlers being separately compiled;
a plurality of schemas stored in a schema table for different types of output messages, each schema in the schema table pointing to at least one of said handlers stored in the handler table and containing a grammar definition for one or more fields of the output message; and
code for a common internal message format object, said handlers being configured to populate the output message with fields from the common internal message format object.

17. The engine of claim 16, wherein said handlers further comprise code for translating a value from the common internal message format object to a format compatible with the output message.

18. The engine of claim 16, wherein a field in said common internal message format object determines a format of the output message.

19. The engine of claim 16, wherein the output message format is determined by a destination for the output message.

20. An apparatus for building an output message from a common internal message format object, comprising:
a processor; and
a memory coupled to said processor, said memory comprising instructions that when executed by said processor cause the processor to:
determine a schema for the output message, the output message comprising a plurality of fields;
retrieve a plurality of handlers based on said schema, each handler being code for building at least one field of said plurality of fields of the output message from said common internal message format object, each of said handlers being separately compiled; and
translate said common internal message format object into said output message using said handlers.

21. The apparatus of claim 20 further comprising instructions which cause the processor to dynamically load one of said handlers without recompiling the other handlers.

22. The apparatus of claim 20 further comprising instructions which cause the processor to determine the schema based on a field in the common internal message format object.

23. The apparatus of claim 20 further comprising instructions which cause the processor to determine any fields in said output message that are not in said common internal message format object and to remove said fields that are not in said common internal message format object from said output message.

24. The apparatus of claim 20 further comprising instructions which cause the processor to determine an output message format based on a destination of the output message.

* * * * *